(12) United States Patent
Ling

(10) Patent No.: US 7,063,602 B2
(45) Date of Patent: Jun. 20, 2006

(54) MOUNTING APPARATUS FOR POLISHING END FACES OF OPTICAL FIBERS

(75) Inventor: Kow-Je Ling, Taipei (TW)

(73) Assignee: Hermosa Thin Film Co., Ltd., Taipei (TW)

( * ) Notice: Subject to any disclaimer, the term of this patent is extended or adjusted under 35 U.S.C. 154(b) by 0 days.

(21) Appl. No.: 10/965,870

(22) Filed: Oct. 18, 2004

(65) Prior Publication Data
US 2005/0085173 A1 Apr. 21, 2005

(30) Foreign Application Priority Data
Oct. 20, 2003 (TW) .............................. 92129054 A

(51) Int. Cl.
*B24B 7/00* (2006.01)

(52) U.S. Cl. ..................... 451/278; 451/384; 451/390

(58) Field of Classification Search ................ 451/259, 451/270, 271, 278, 280, 41, 384, 390
See application file for complete search history.

(56) References Cited

U.S. PATENT DOCUMENTS

| | | | | |
|---|---|---|---|---|
| 5,216,846 A | * | 6/1993 | Takahashi | 451/57 |
| 5,351,445 A | * | 10/1994 | Takahashi | 451/271 |
| 5,743,787 A | * | 4/1998 | Ishiyama et al. | 451/41 |
| 6,077,154 A | * | 6/2000 | Takashi et al. | 451/271 |
| 6,582,286 B1 | * | 6/2003 | Minami et al. | 451/270 |
| 6,800,021 B1 | * | 10/2004 | Minami et al. | 451/278 |

* cited by examiner

*Primary Examiner*—Jacob K. Ackun, Jr.
(74) *Attorney, Agent, or Firm*—Troxell Law Office, PLLC

(57) ABSTRACT

A mounting apparatus for polishing end faces of optical fibers, comprising a main body with fixing grooves; a fixing rod is accepted in each fixing groove; the upper end of the fixing rod is combined with the supporting stand; the bottom of the fixing rod has diametrically protruding engaging portion to allow the fixing rod not to be contacted with the fixing groove except at the engaging portion; the fixing groove is indented below the main body to cause a contact face of the bottom of the fixing rod and the fixing groove is on a same plane with a contact face of the polished end faces of optical fibers and a polishing surface to allow a same polished shape to be obtained at a same batch work of the polished end faces. Whereby, the polishing speed and quality can be enhanced.

24 Claims, 24 Drawing Sheets

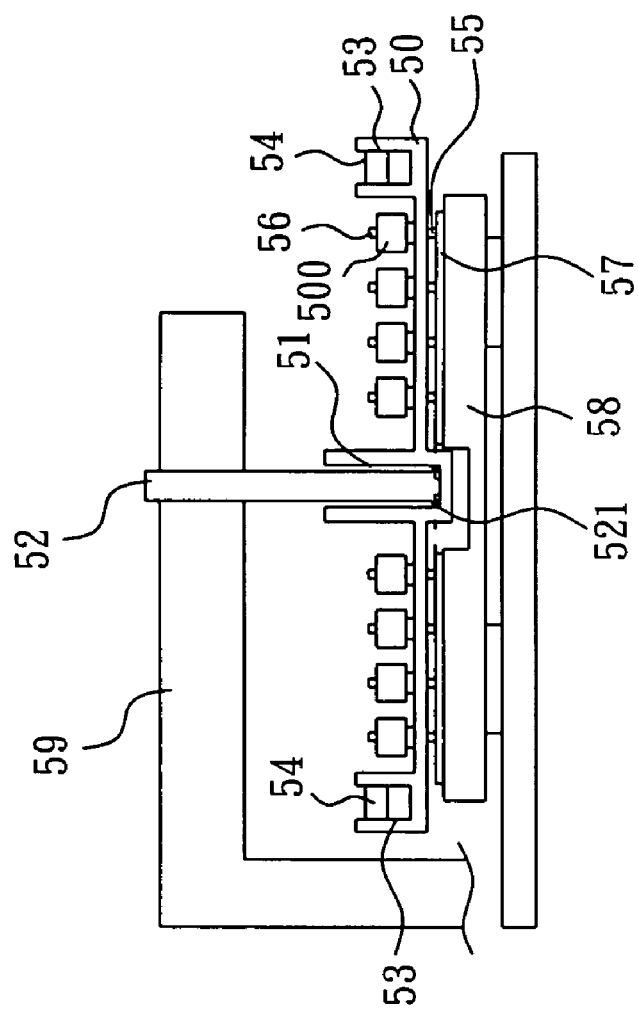
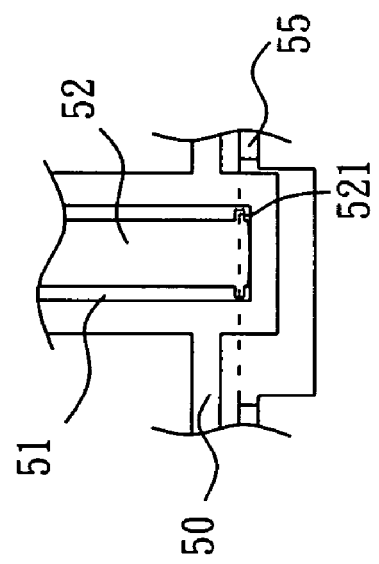
FIG. 7

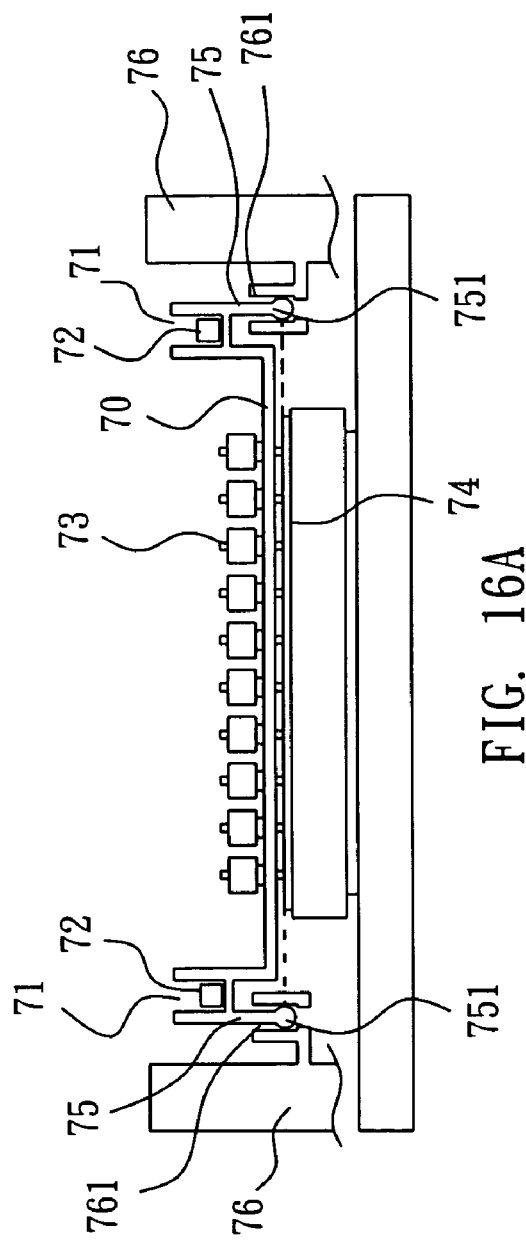
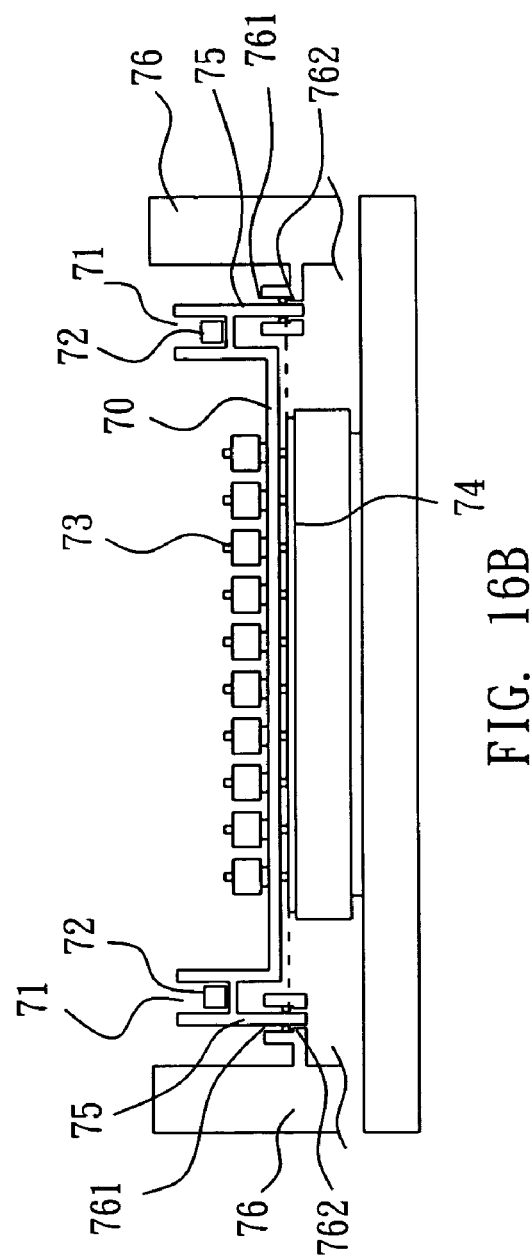
FIG. 16A
FIG. 16B

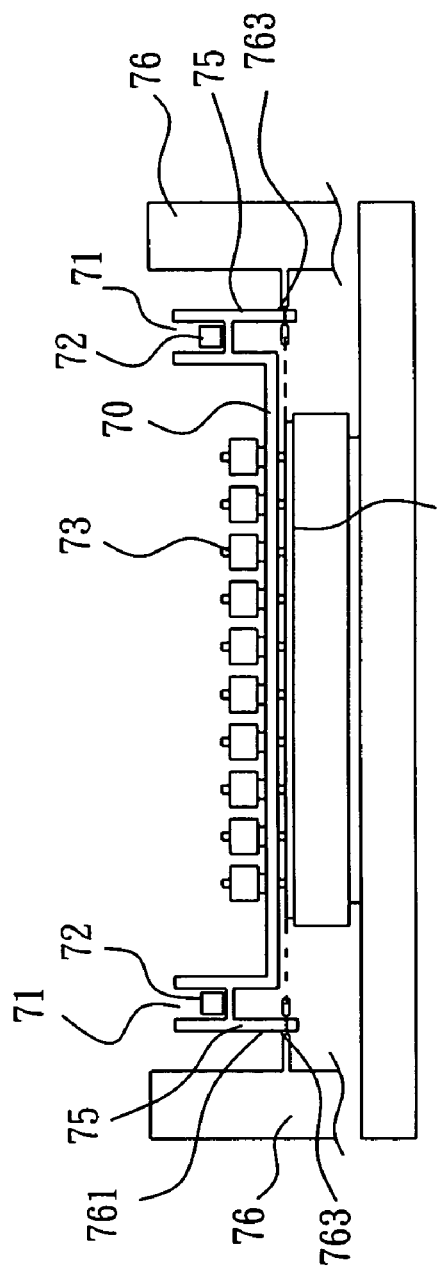
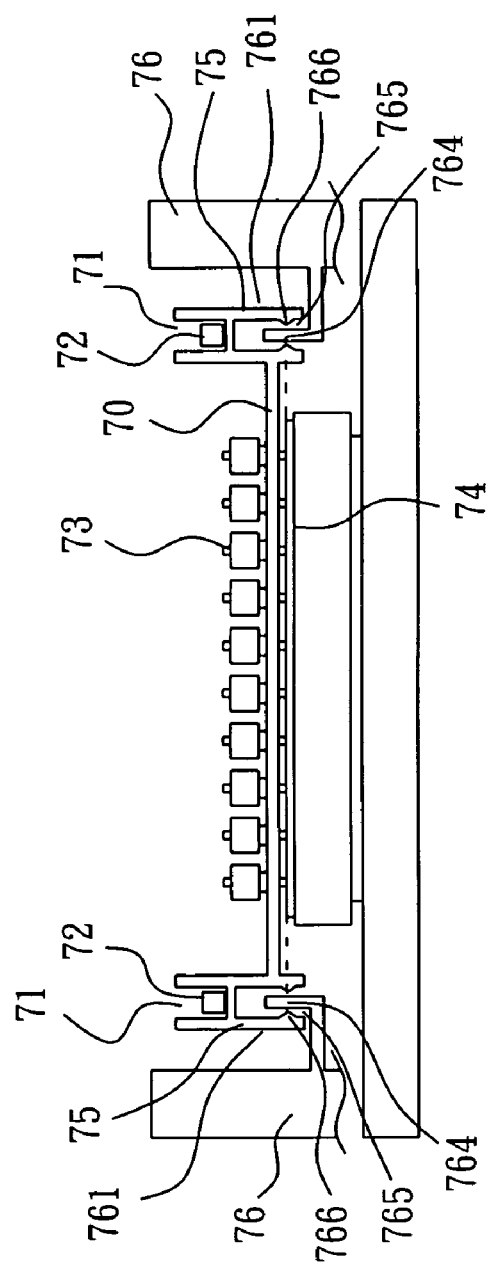
FIG. 16C
FIG. 16D

MOUNTING APPARATUS FOR POLISHING END FACES OF OPTICAL FIBERS

BACKGROUND OF THE INVENTION

1. Field of the Invention

The present invention relates to an apparatus for polishing the end faces of workpieces, and more particularly to an apparatus for mounting end faces to be polished of optical fibers.

2. Description of Related Art

Optical fiber communication is an indispensable tool for current and future communication technology; it needs to connect a signal line with a signal connector in the optical fiber communication as a communication element in a wired telecommunication system does. Optical fiber connectors are needed in an optical fiber communication system. The optical fiber connecter is formed mainly by passing a fiber through a ferrule with a hole in the middle thereof and then sticking them with an adhesive. Such kind of ferrule can be made from plastics, glass or ceramics. The end face of the optical fiber stuck with the ferrule is placed at and pressed with a pressure on an elastic polishing surface to form a protruding spherical surface after coarse grinding, fine grinding and polishing. The protruding spherical surface must be a flawless smooth surface. The optical axis of the protruding spherical surface can be parallel to or form a small oblique angle with the center line of the optical fiber.

An elastic polishing surface is used at least at the fine grinding and polishing in the process of the polishing of the end face of an optical fiber. As FIG. 1 shows, workpieces 1 to be polished is placed on an elastic polishing surface 2 and a pressure 3 is exerted on the workpieces 1 to cause the elastic polishing surface 2 to form an indentation surface so that the workpieces 1 with a protruding end face can be polished out. Because the cross-sectional face of the an optical fiber is rather small, the time for coarse grinding, fine grinding and polishing is approximately ten more to several ten seconds; it is much shorter than the time for polishing a traditional optical lens. When the end face of an optical fiber is polished, the polishing strength at the same time or average polishing strength in a relatively shorter time must be same for the end face of every optical fiber on apparatus for mounting the end faces of optical fibers, otherwise an uneven phenomena will be yielded after polishing.

Basically, the abrasion degree of a workpiece relates to many factors, but the two main ones are as the following:

1. the average relative velocity of the polishing surface and the workpiece; and
2. the magnitude of a pressure between the polishing surface and the workpiece.

In the traditional polishing of the end face of an optical fiber, the mounting apparatus of the end face of an optical fiber is unmoved and a polishing surface is rotated and revolved. As FIG. 2 shows, $\phi$ is the angle of rotation and $\theta$ is the angle of revolution. From a mathematical analysis disclosed in Taiwan patent No. 485,586 "Polishing apparatus for end face of optical engine", we know that the average relative velocity of a certain point on the mounting apparatus of an optical fiber and the polishing surface is as the following:

$$\text{Average relative velocity} = (r_1)^2 \dot{\phi}^2 + R^2 (\dot{\phi} - \dot{\theta})^2 \qquad (1),$$

Wherein R is the distance between the center of revolution and the center of rotation, $\dot{\phi}$ is the angle velocity of rotation, $\dot{\theta}$ is the angle velocity of revolution and $r_1$ is the distance between a certain point on the mounting apparatus of the end faces of optical fibers to the center of revolution.

In the process of polishing, the angle velocity of revolution $\dot{\theta}$ and the angle velocity $\dot{\phi}$ of rotation generally are fixed. From formula (1) we know that the average relative velocities at the different points on the end faces of optical fibers are different. But, if $r_1$s are same, i.e. $r_1$s are same at a circumference taking the center of revolution as a center point, and if the pressure at every point on the circumference is same, the abrasion degree for every point on the circumference is same. If $\dot{\phi}=0$ is set, i.e. only the revolution is existed for the polishing surface without the rotation, the average relative velocity=$R^2 \dot{\theta}^2$ is then formed, the abrasion degree for each end face is same if the pressure between each end face of an optical fiber on the mounting apparatus of the optical fibers of optical fibers and the polishing surface is uniform at this time.

Furthermore, the patent mentioned above also points out that if the polishing face is made to be a long strip type, and polishing particles at one side of the long strip are coarser and polishing particles at another side thereof is finer, and the pressure between the end face of an optical fiber mounted at a different location on the mounting apparatus and the polishing surface is uniform after a proper arrangement. And then, the mounting apparatus can be slid from the side at which the particle is coarser to the side at which the particle is finer to complete the coarse and the fine grindings and the polishing directly at one time.

As FIG. 3 shows, mounting apparatuses 4, 5 and 6 are slid on the long strip type polishing surface 7 simultaneously. The particle at the right side of the polishing surface 8 is coarser, but the particle at the left side of the polishing surface 9 is finer.

Basically, the reasons that the pressure is not uniform are two:

1. the supporting point of the mounting apparatus is not on the force exerted surface yielded from the friction between the end face and the polishing surface. Therefore, a torque force is yielded to cause the mounting apparatus to be inclined so that the phenomenon of the uneven pressure is formed.
2. if the mounting apparatus is clamped and fixed, that the polishing surface and the mounting apparatus are not parallel can also cause the phenomenon of a uneven pressure to be formed.

Please refer to FIGS. 4 and 5. A polishing apparatus of optical fibers comprises a polishing surface 21, ferrules 22 of the end faces of optical fibers, a mounting apparatus 23 of optical fibers and a pressure exerted fixing rod 24. The ends to be polished of optical fibers 25 are combined with the ferrules 22. When the end faces of optical fibers 25 are moved relatively to the polishing surface 21, the mounting apparatus 23 is exerted with a transversal force at the end face thereof. But, because a supporting point is at a contact point 31 or contact point 32 at this time, the mounting apparatus is exerted with an anticlockwise torque so that an inclined state thereof is yielded to an end face 251 of an optical fiber is lower than an end face 252 of another optical fiber, i.e. the pressure on the end face 251 is larger than the one on the end face 252.

For solving these problems, the U.S. Pat. No. 5,216,846 discloses a spacer to keep the distance between a workpiece and a polishing surface constant. Because the polishing surface is an elastic polishing surface, keeping the distance constant is keeping a pressure constant. Because the spacer endure a part of uneven pressure, a little improvement might be attained in such manner, but the basic structure thereof is not changed, the torque is still existed so that the cause of the existence of the pressure is still existed.

Moreover, the U.S. patent discloses that a pressure sensor is used to measure an instant pressure, and then a method for electrically controlling a spring to compensate the unevenness of the pressure.

Furthermore, as FIG. 6 shows, the U.S. Pat. Nos. 6,077,154 and 5,351,445 propose the designs clamping and fixing the end face of an optical fiber. Amounting apparatus 41 is combined with a plurality of optical fiber fixtures 42; the fixtures 42 are used to clamp optical fibers 43 and fix the mounting apparatus 41 over a polishing surface 45. Because the mounting apparatus 41 is fixed by being clamped in such kind of design, the inclined problem yielded from a torque does not happen. But, because the mounting apparatus 41 is fixed by being clamped and the direction of the polishing surface 45 is also fixed, the mounting apparatus 41 and the polishing surface 45 are certainly not parallel precisely under a normal condition. A general practice is to do an adjustment to allow the mounting apparatus 41 to fix the angles of the fixtures 44. However, this is not a natural contact, a little unparallel phenomenon always happens. Besides, the pressure between the end face of the optical fiber 43 and the polishing surface 45 is exerted from below to above in such kind of design. This manner is not only too complex but also inconvenience on automation. Furthermore, if the design of the polishing surface is long strip type and a plurality of mounting apparatuses are slid on this long strip type polishing surface simultaneously as FIG. 3 shows, keeping the pressures at the end faces of optical fibers at different locations on each mounting apparatus uniform is more difficult.

Furthermore, except the polishing quality of the end faces of optical fibers are not good, when the pressure is not uniform, especially if a great amount of the end faces of optical fibers on the mounting apparatus are polished simultaneously, much more time must be spent on completing the polishing of a portion that the pressure is smaller so that the polishing efficiency is influenced. Therefore, the more the end faces of optical fibers are polished simultaneously at one time, the more important whether the pressure distribution is uniform is.

SUMMARY OF THE INVENTION

After analyzing the conventional technology mentioned above, the best design principles for a mounting apparatus of the end faces of optical fibers that the inventor of the present invention development are:

1. the mounting apparatus cannot be fixed by clamping, and the mounting apparatus and a polishing surface must be naturally contacted, i.e. if any upward and downward oscillation happens in the polishing surface, the mounting apparatus must be oscillated with the polishing apparatus upward and downward, and the average pressure at the end face of a different location on the mounting apparatus must be uniform.
2. the plain plane formed by the end faces of optical fibers in the process of polishing is the force exerted surface where the polishing surface exerts force on the mounting apparatus. Because the end faces of optical fibers are not moved or rotated with the polishing surface in the process of polishing in principle, one or several supporting point(s) must be designed for the mounting apparatus. For the pressure to be uniform, these supporting points must be on this force-exerted surface so as to prevent the mounting apparatus from moving or rotating with the polishing surface.

The main object of the present invention is to provide a mounting apparatus for polishing the end faces of optical fibers, allowing supporting points to be on a plain plane formed from a force-exerted surface. In practice, the location of supporting point is allowed to be less then 20 mm above or below the force-exerted surface, and the best is in the distance of less then 10 mm so as to prevent the mounting apparatus from being inclined to yield an uneven pressure phenomenon.

Another object of the present invention is to provide a mounting apparatus of the end faces of optical fibers, placing counterweights directly at proper locations on the mounting apparatus or using springs, air pressure, oil pressure or counterweights to add pressure on a fixing rod, and than add pressure on the mounting apparatus through the fixing rod to cause a naturally contacted pressure exerted way to be formed between the end faces of optical fibers on the mounting apparatus and the polishing surface.

BRIEF DESCRIPTION OF THE DRAWINGS

The present invention can be more fully understood by reference to the following description and accompanying drawings, in which:

FIG. 7 is across sectional view, showing amounting apparatus of a first preferred embodiment according to the present invention and an amplified part thereof;

FIGS. 16A to 16D are cross sectional views, showing a variety of practice patterns of a fourth preferred embodiment according to the present invention;

DETAILED DESCRIPTION OF THE PREFERRED EMBODIMENTS

Figure 1:
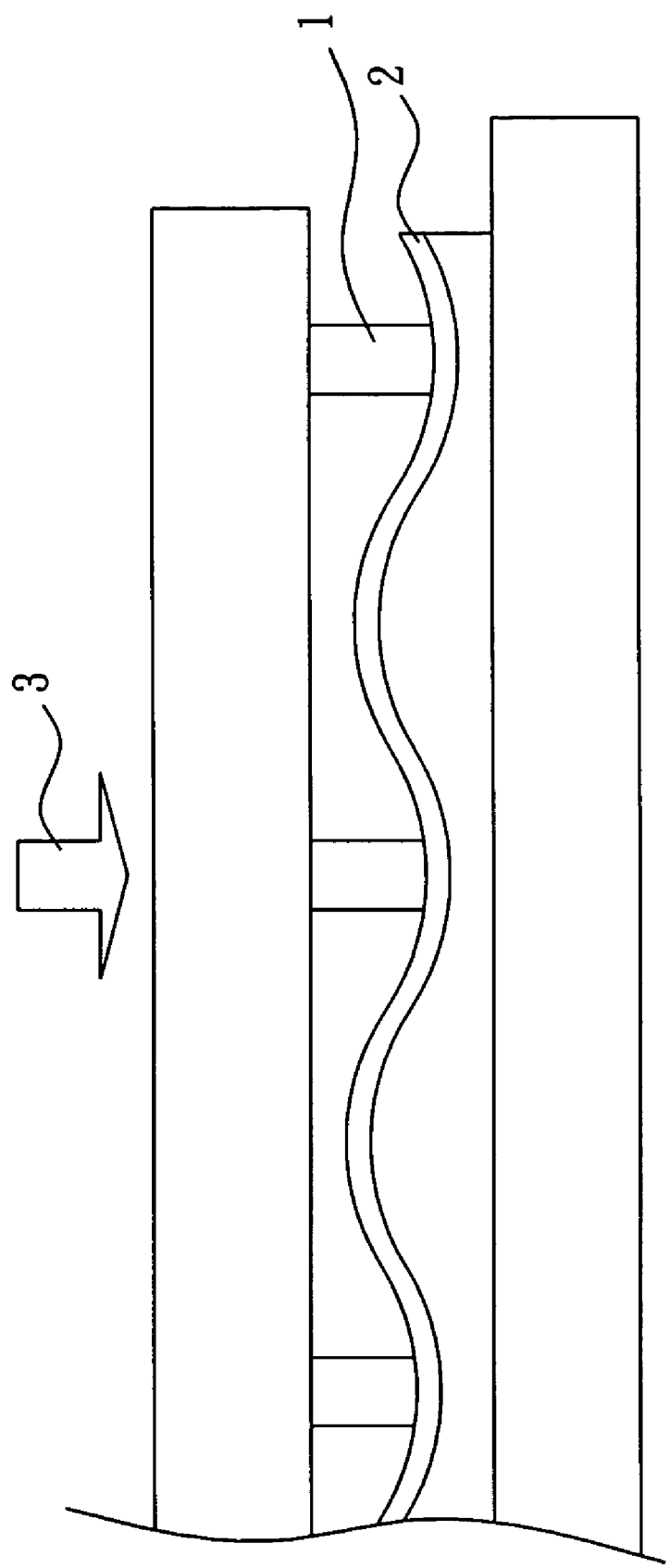
FIG. 1 is a schematic view, showing that workpieces are polished with a general elastic polishing surface.
Figure 2:
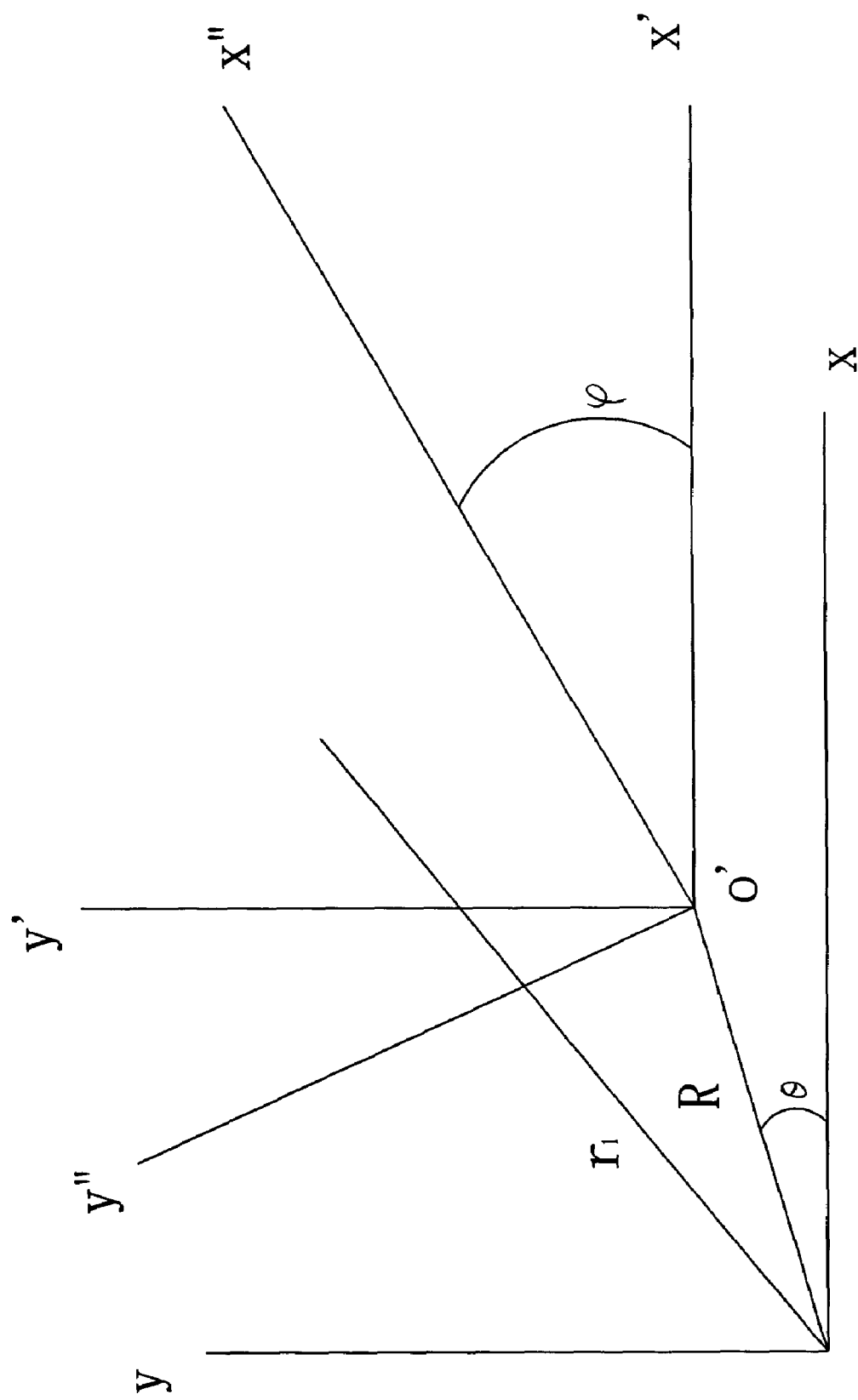
FIG. 2 is a coordinate graph for the mathematical analysis of rotation and eccentric revolution of a general polishing surface.
Figure 3:
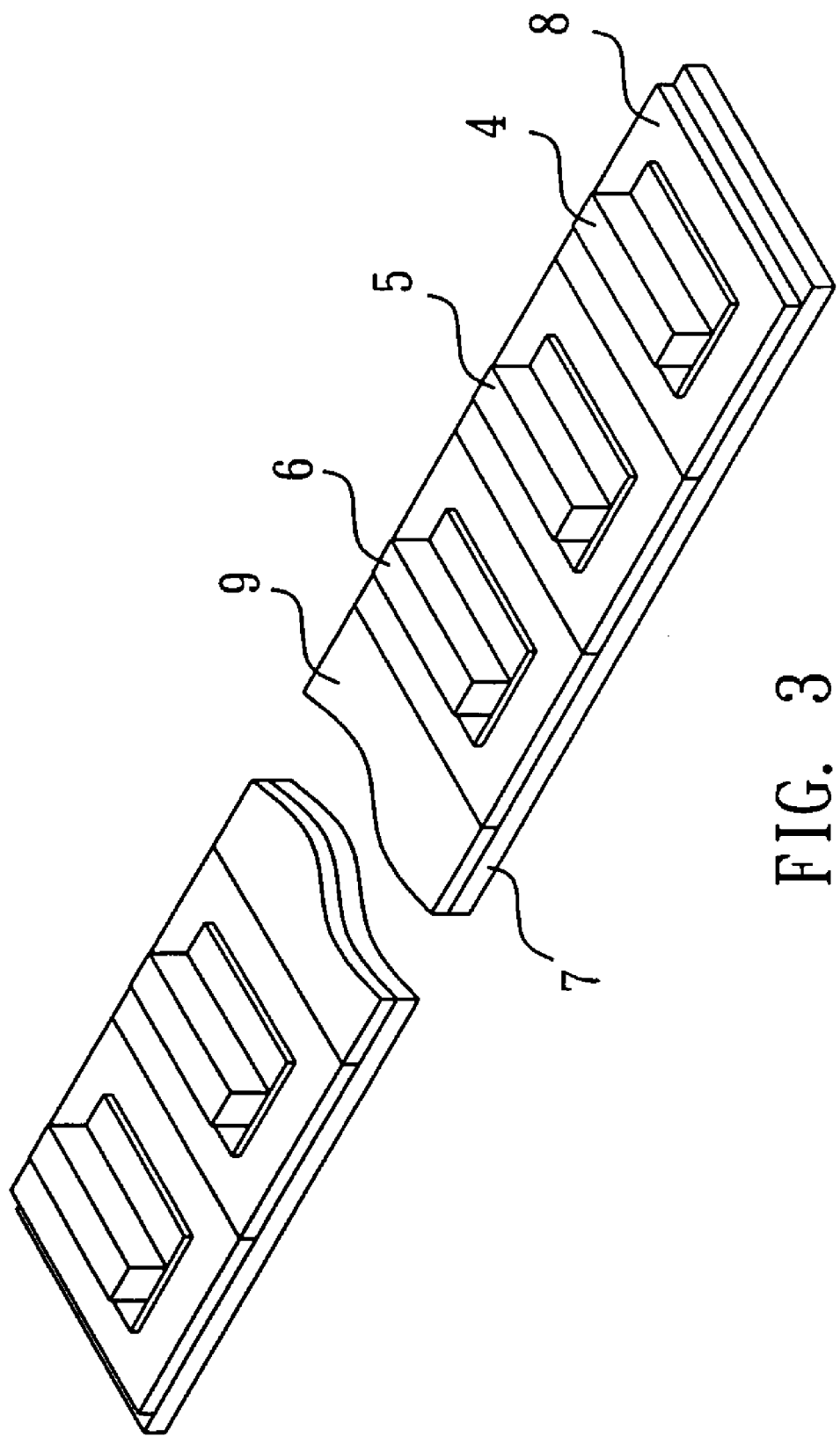
FIG. 3 is a prospective view, showing a conventional polishing apparatus.
Figure 5:
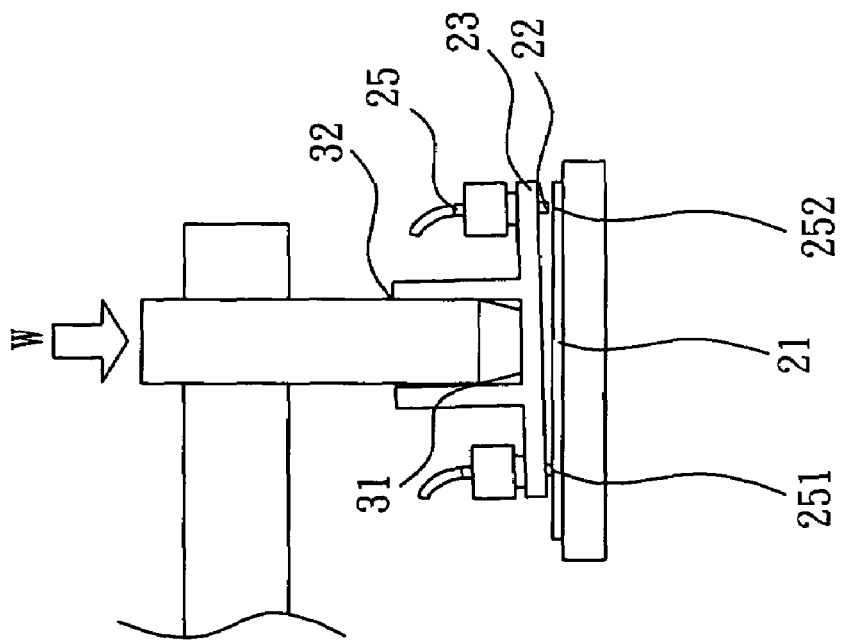
FIG. 5 is a cross sectional view, showing a conventional polishing apparatus in use.
Figure 4:
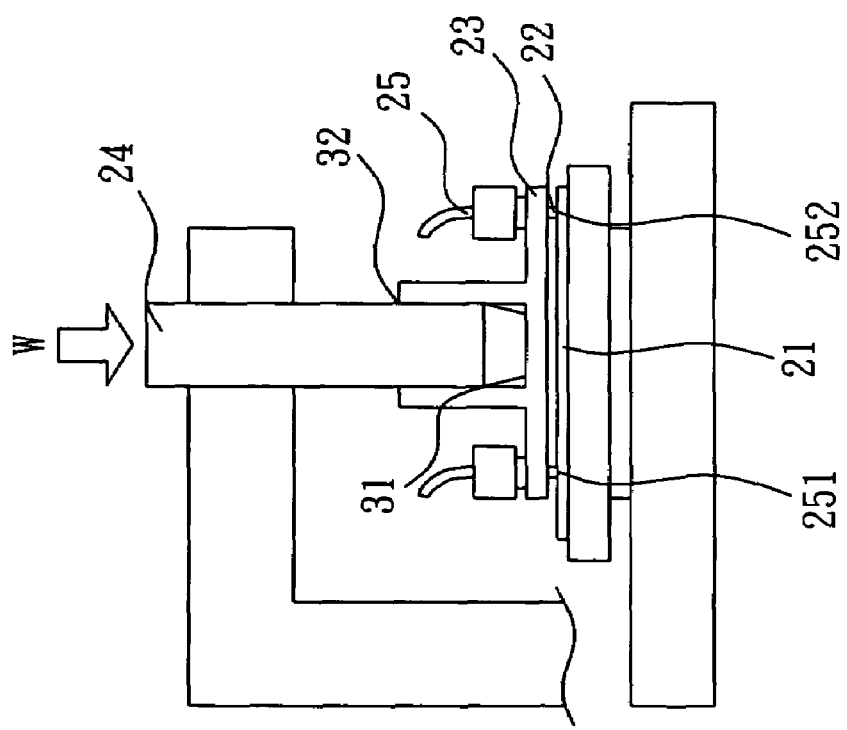
FIG. 4 is a cross sectional view, showing a conventional polishing apparatus.
Figure 6:
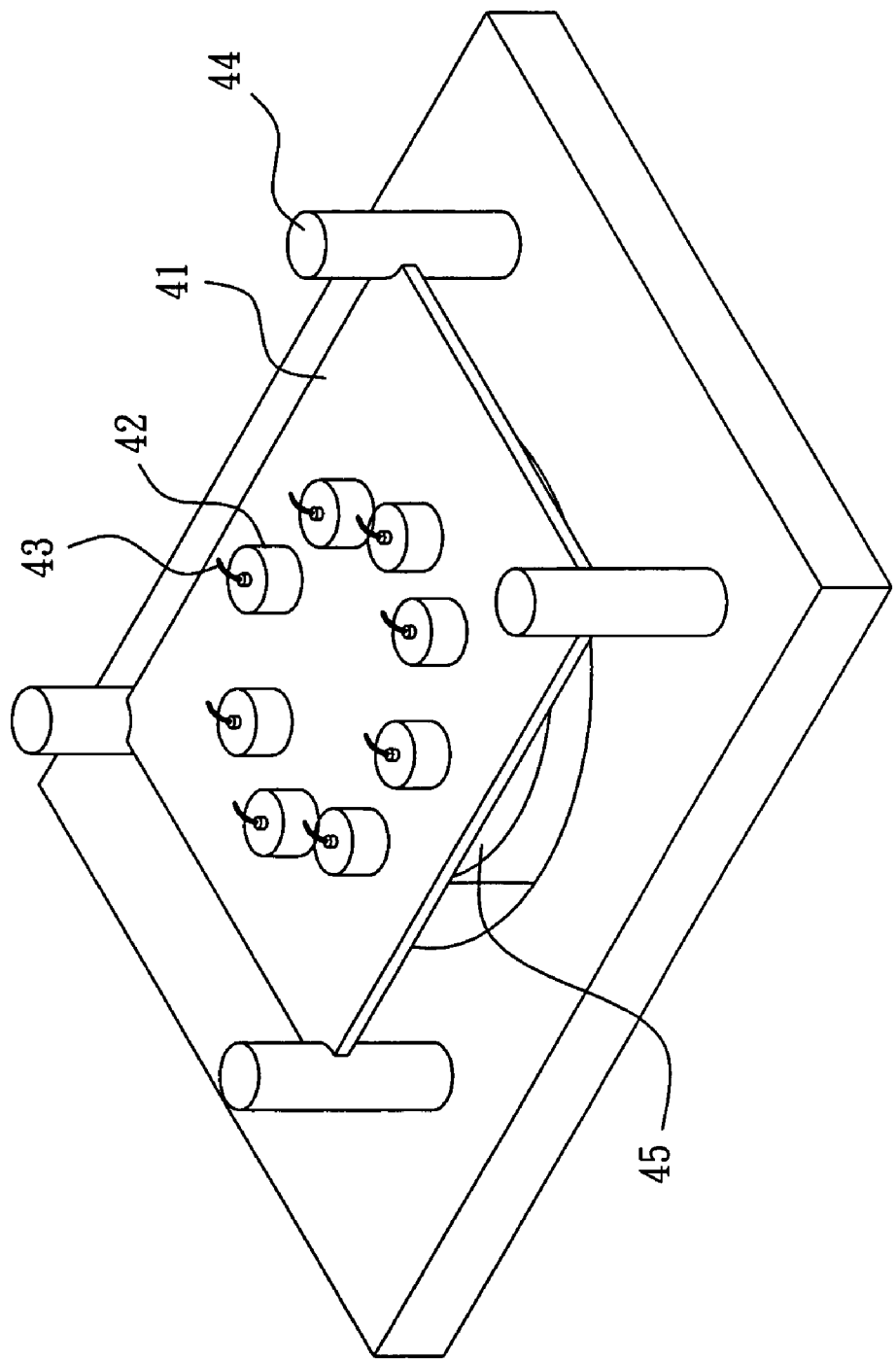
FIG. 6 is a prospective view, showing that a conventional mounting apparatus is combined with fixtures.
Figure 8:
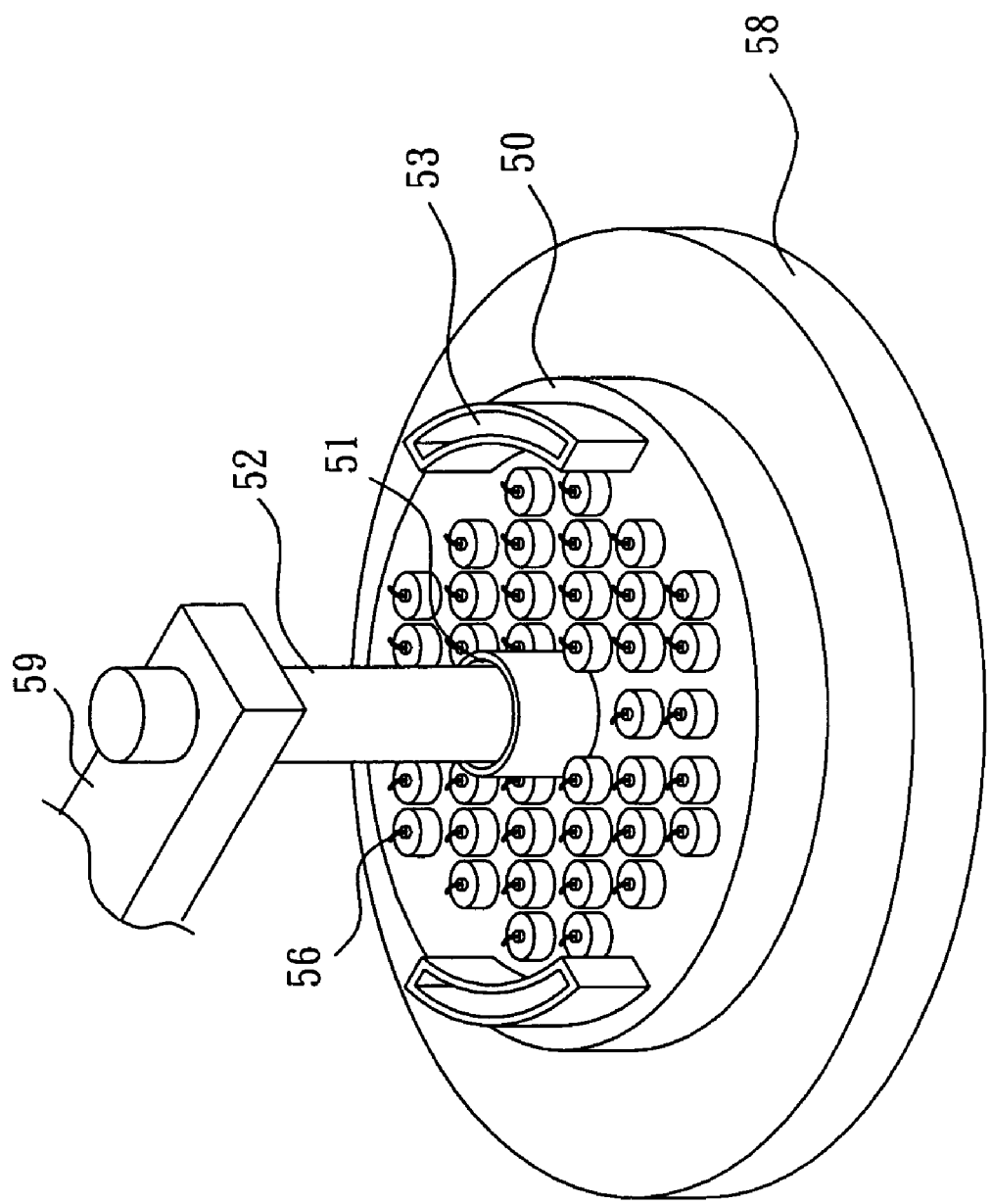
FIG. 8 is a prospective view, showing a first practice pattern of a first preferred embodiment according to the present invention.
Figure 9:
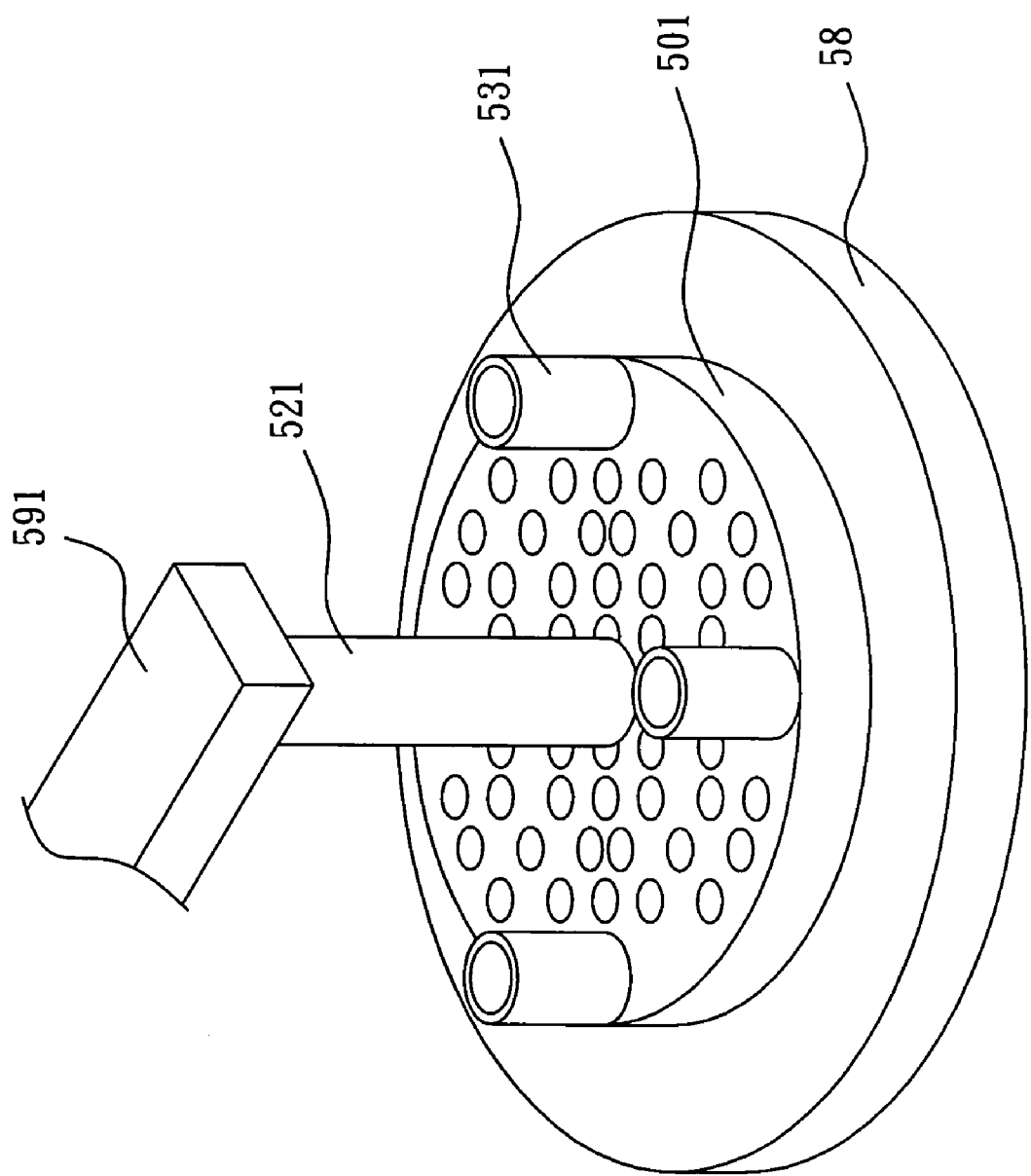
FIG. 9 is a prospective view, showing a second practice pattern of a first preferred embodiment according to the present invention.
Figure 10:
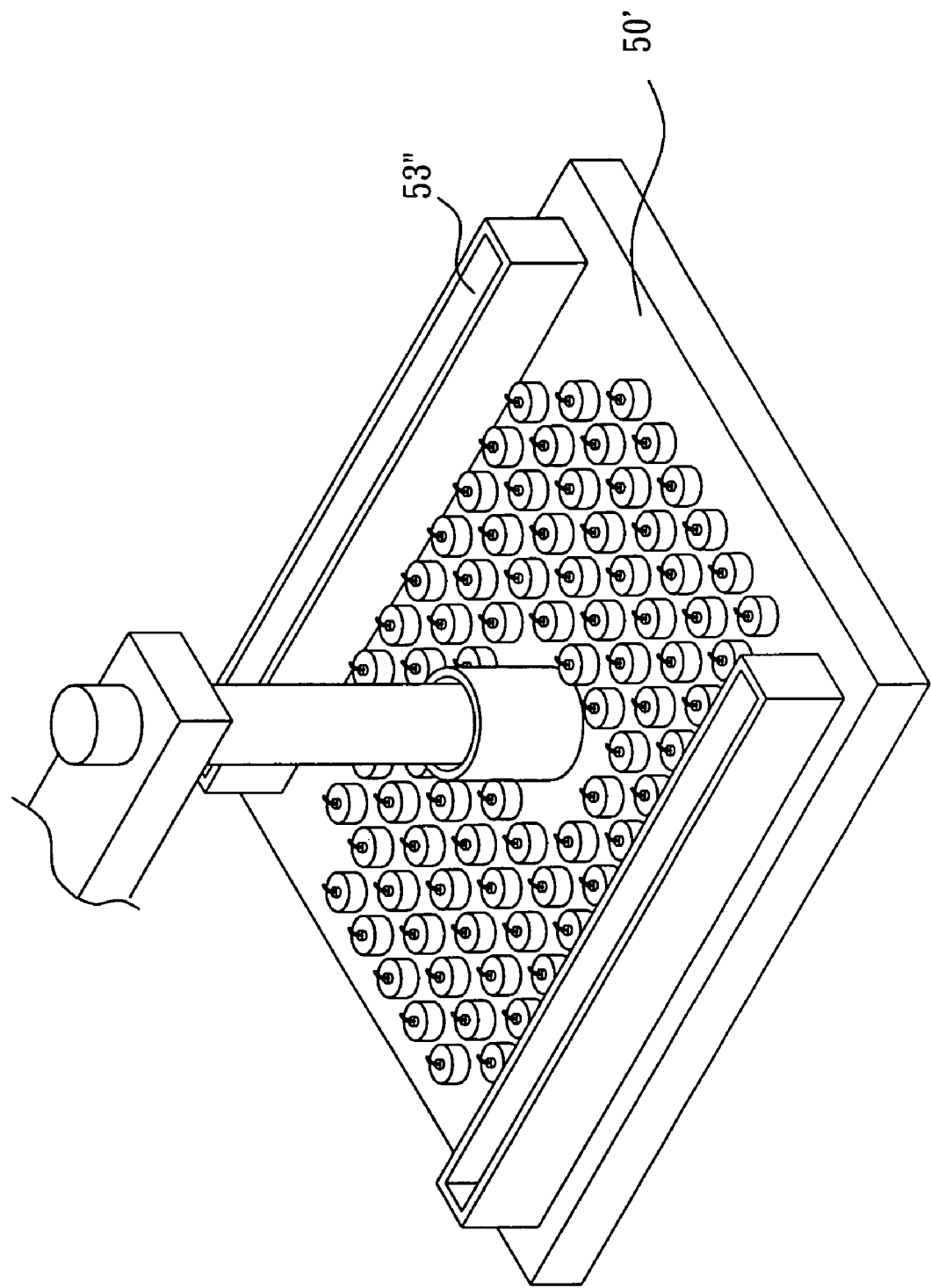
FIG. 10 is a prospective view, showing a third practice pattern of a first preferred embodiment according to the present invention.
Figure 11A:
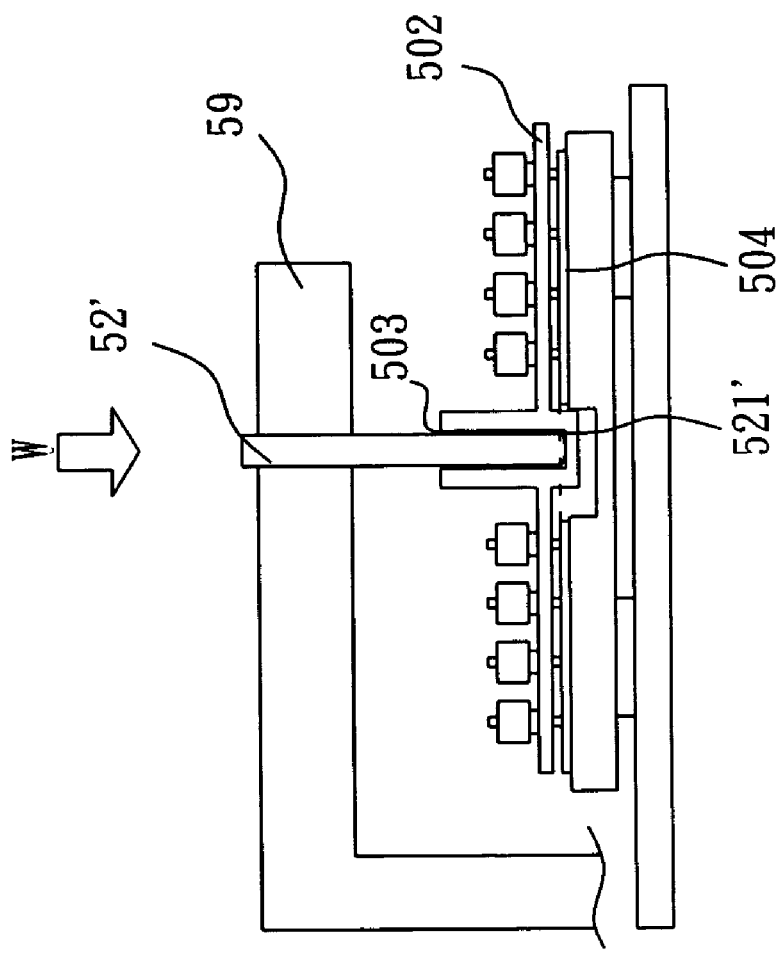
FIG. 11A, 11B are cross sectional views, showing a mounting apparatus of a second preferred embodiment according to the present invention and an amplified part thereof.
Figure 11B:
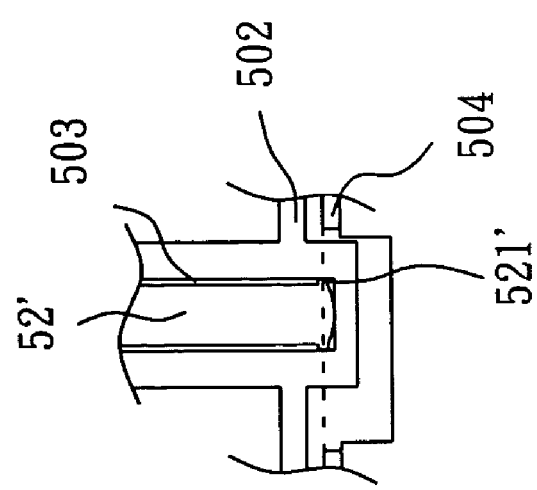
Figure 12:
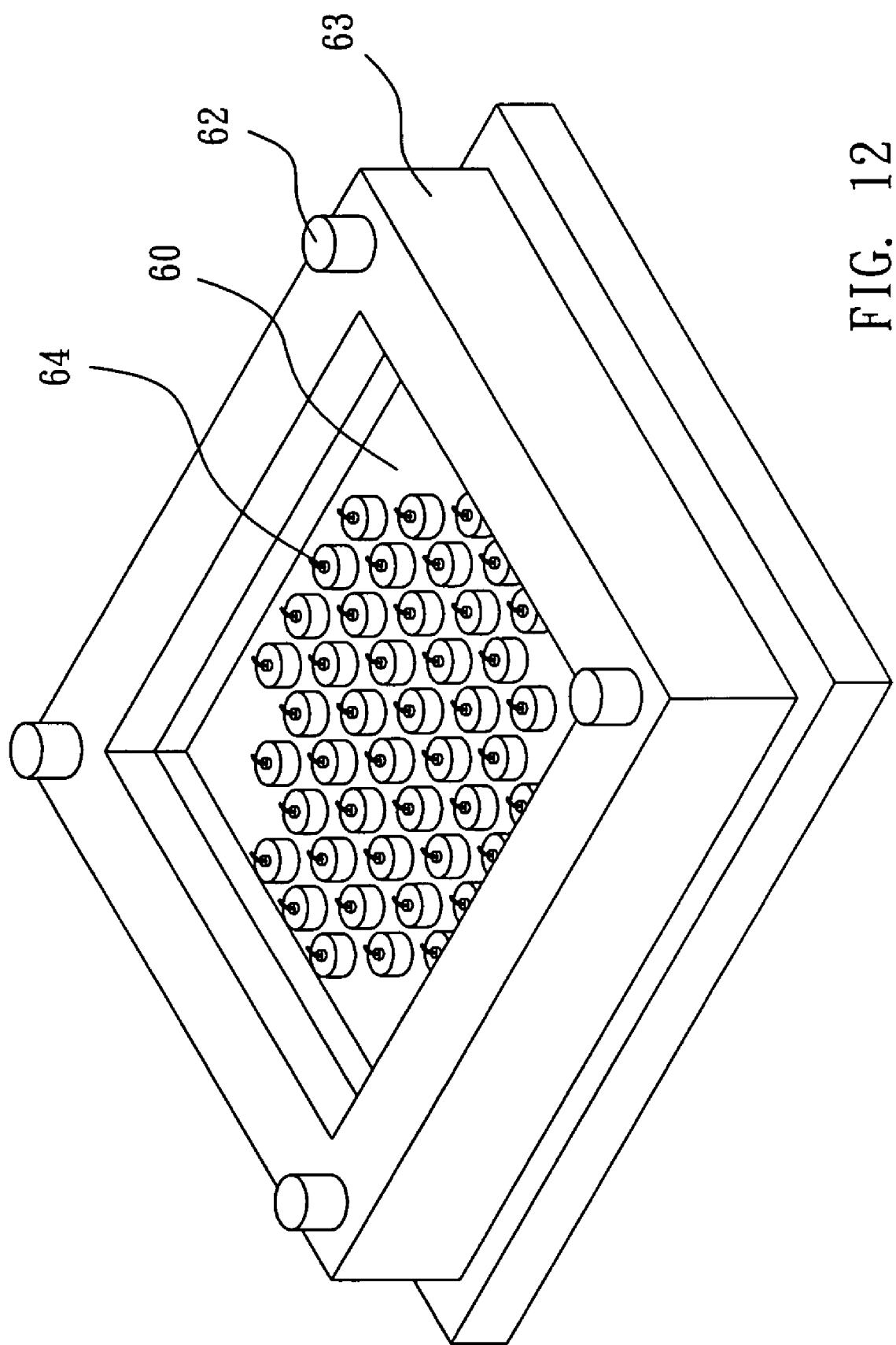
FIG. 12 is a prospective view, showing a first practice pattern of a second preferred embodiment according to the present invention.
Figure 13:
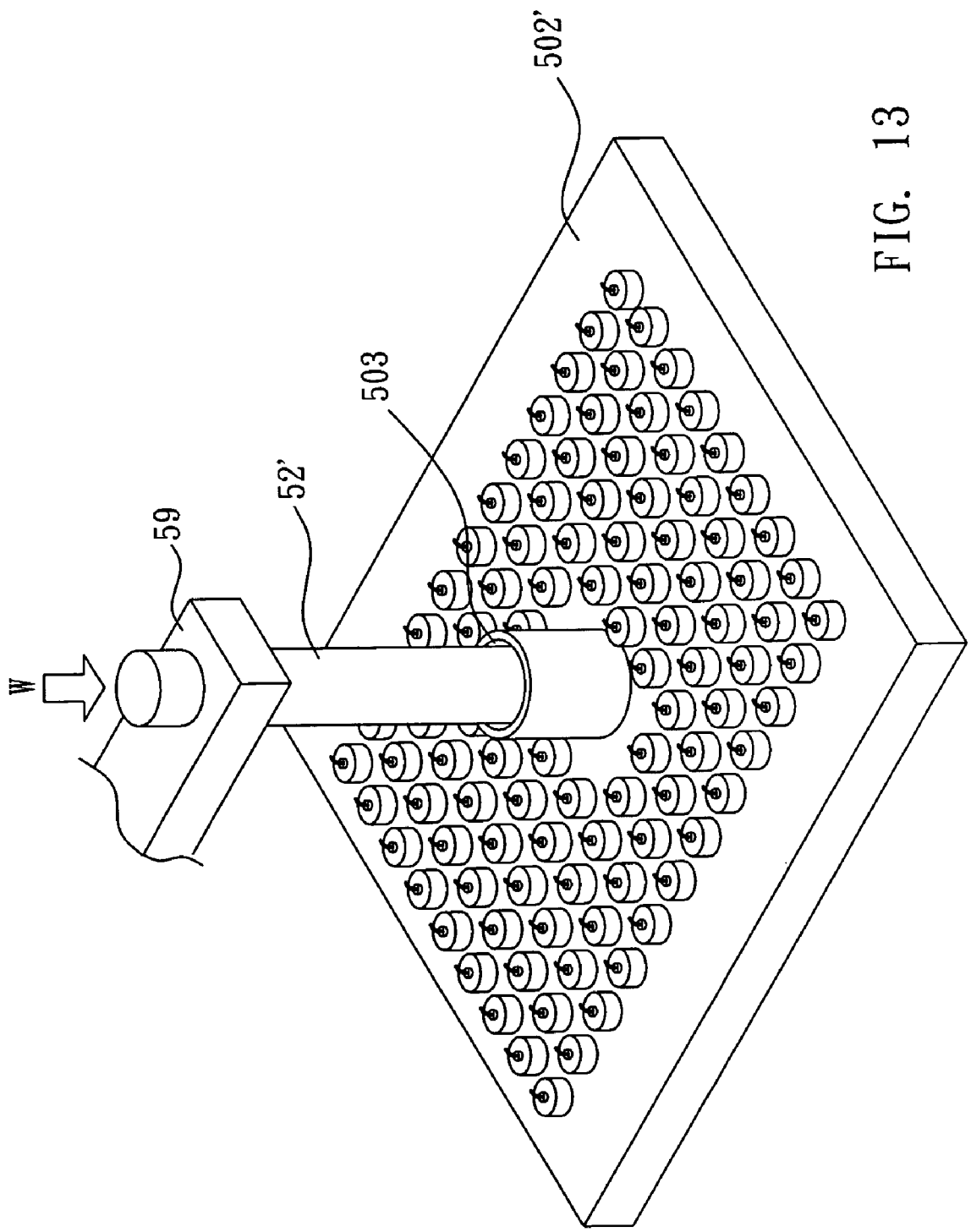
FIG. 13 is a prospective view, showing a second practice pattern of a second preferred embodiment according to the present invention.

Please refer to FIGS. 7 to 10. Mounting apparatuses 50 and 50' of a first preferred embodiment according to the present invention respectively comprise a fixing groove 51 indented below a main body at the center of the main body for accepting a fixing rod 52 and a plurality of symmetric accepting grooves 53, 53' or 53" disposed respectively at the flank sides adjacent to the circumference of the main body for accepting counterweights 54. The accepting grooves respectively are arc groove, cylinder and rectangular groove. The main bodies of the mounting apparatuses 50 and 50' respectively are circular and square shapes. And, the main body of the mounting apparatus 50 is also combined with a plurality of fixtures 500. Each fixture 500 is combined with at least one ferrule 55 for the end face of an optical fiber so as to combine with an optical fiber 56 to be polished. A polishing surface 57 is below the ferrule 55 and the polishing surface 57 is combined with a base seat 58 at the upper side thereof. The upper end of the fixing rod 52 is combined with a supporting stand 59. an engaging portion 521 with a diameter protruded out from the circumference of the fixing rod 52 is disposed at the bottom of the fixing rod 52; the engaging portion 521 and the fixing groove are formed as corresponding convex and concave faces, such as the design of corresponding polygons, so that a rotation is not allowed to happen between the fixing rod 52 and the fixing groove 51, as an amplified view in FIG. 7 shows. The function of the fixing rod 52 is only to fix the mounting apparatus 50 to cause it not to move or rotate. The fixing rod 52 is not used to provide a downward pressure on the mounting apparatus 50.

The main feature of preferred embodiment is that the only part for the fixing rod 52 to contact with the fixing groove 51 is the engaging portion 521 and the contact zone is approximately at the same plane with the contact surface of the polished end faces of a plurality of optical fibers 50 and the polishing surface 57. Therefore, the supporting point of the mounting apparatus 50 is caused to be on the force-exerted surface yielded from the abrasion of the bottom of the optical fiber 56 and the polishing surface 57. Besides, a torque force is not yielded to cause the mounting apparatus 50 to be inclined to yield a phenomenon of a uneven pressure.

Furthermore, the counterweights 54 is used to exert a downward pressure on the mounting apparatus to allow a naturally contacted pressure exerted way is formed between the polished end faces of the optical fibers 56 and the polishing surface 57. When the polishing surface 57 is oscillated up and down, the mounting apparatus is also oscillated up and down as it is so that the contact pressure between the polished end face of the optical fiber 56 at the different location on the mounting apparatus 50 can rather be kept constant. Therefore, a same polished shape can be obtained for a same batch of polishing end faces so that the polishing speed and quality can be enhanced.

Please refer to FIGS. 11A, 11B, 12 and 13. In a second preferred embodiment according to the present invention, almost all structures in the main body of mounting apparatuses 502 and 502' are as same as the first preferred embodiment shown in FIG. 7 except the accepting groove 53. The main bodies of the mounting apparatuses 502 and 502' are respectively formed as circular and square shapes. The pressure exerted way is to add downward pressure directly on the mounting apparatuses 502 and 502' by the fixing rod 52'.

As the amplified view in FIG. 11 shows, for being exerted with a pressure and also being able to contact naturally, the contact surface of the bottom of the fixing rod 52' and the main body of the mounting apparatus 502 must be an arc surface. And, for allowing the mounting apparatus 502 not to be rotated, a protruded portion 521' at the bottom of the fixing rod 52' and fixing groove 503 are still designed as polygon shapes. But, because a downward force is not needed to exert a downward force on the fixing rod 52 shown in FIG. 7, it does not matter whether the bottom is an arc surface. But, because not only the fixing rod 52' is used to fix the mounting apparatus but also a downward force is needed to add upon it and the mounting apparatus is needed to naturally contact with the polishing surface 504 after the pressure is exerted, the bottom of the fixing rod 52' must be formed as an arc surface.

Figure 14:
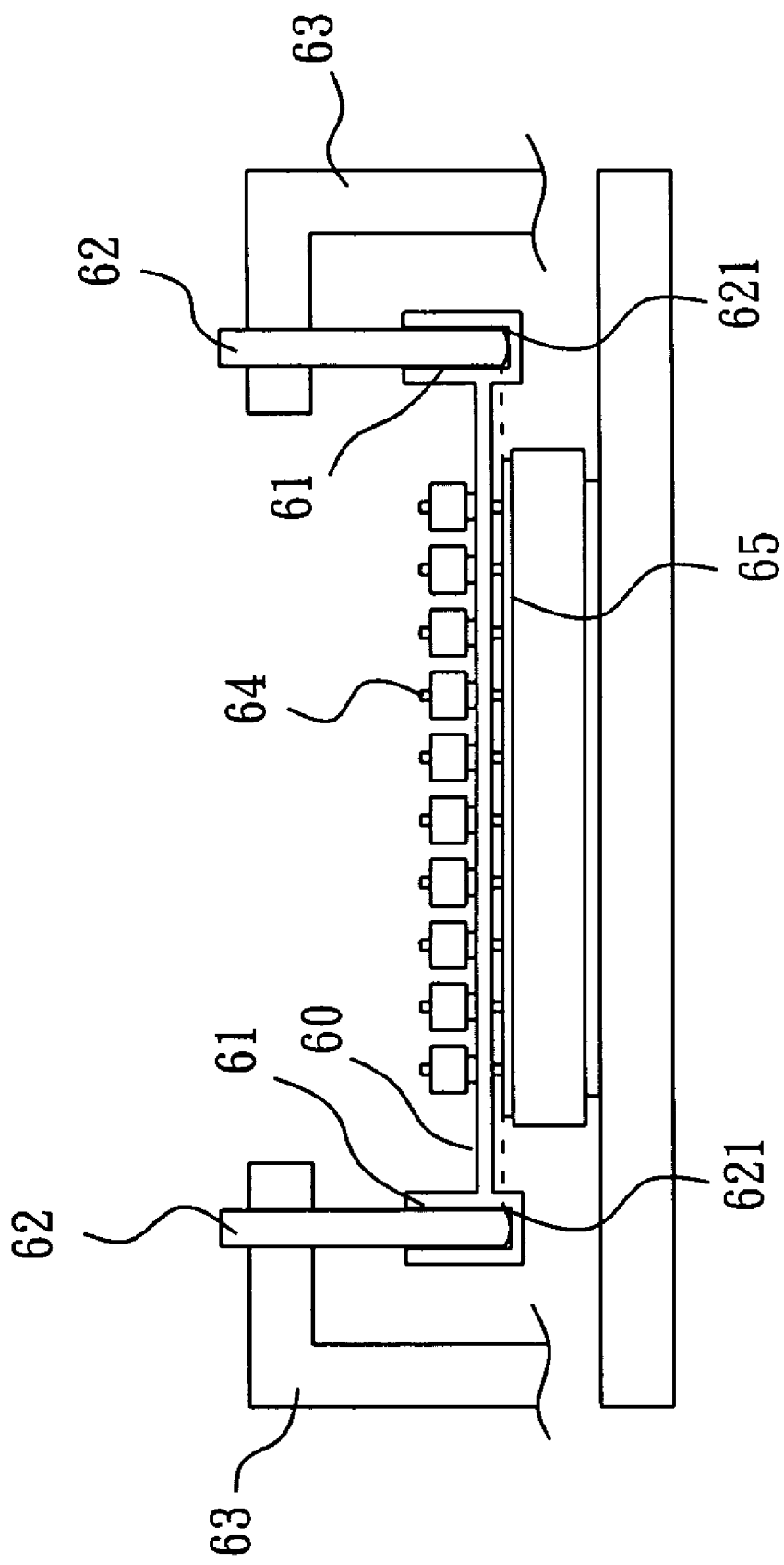
FIG. 14 is a cross sectional view, showing a mounting apparatus of a third preferred embodiment according to the present invention.
Figure 15:
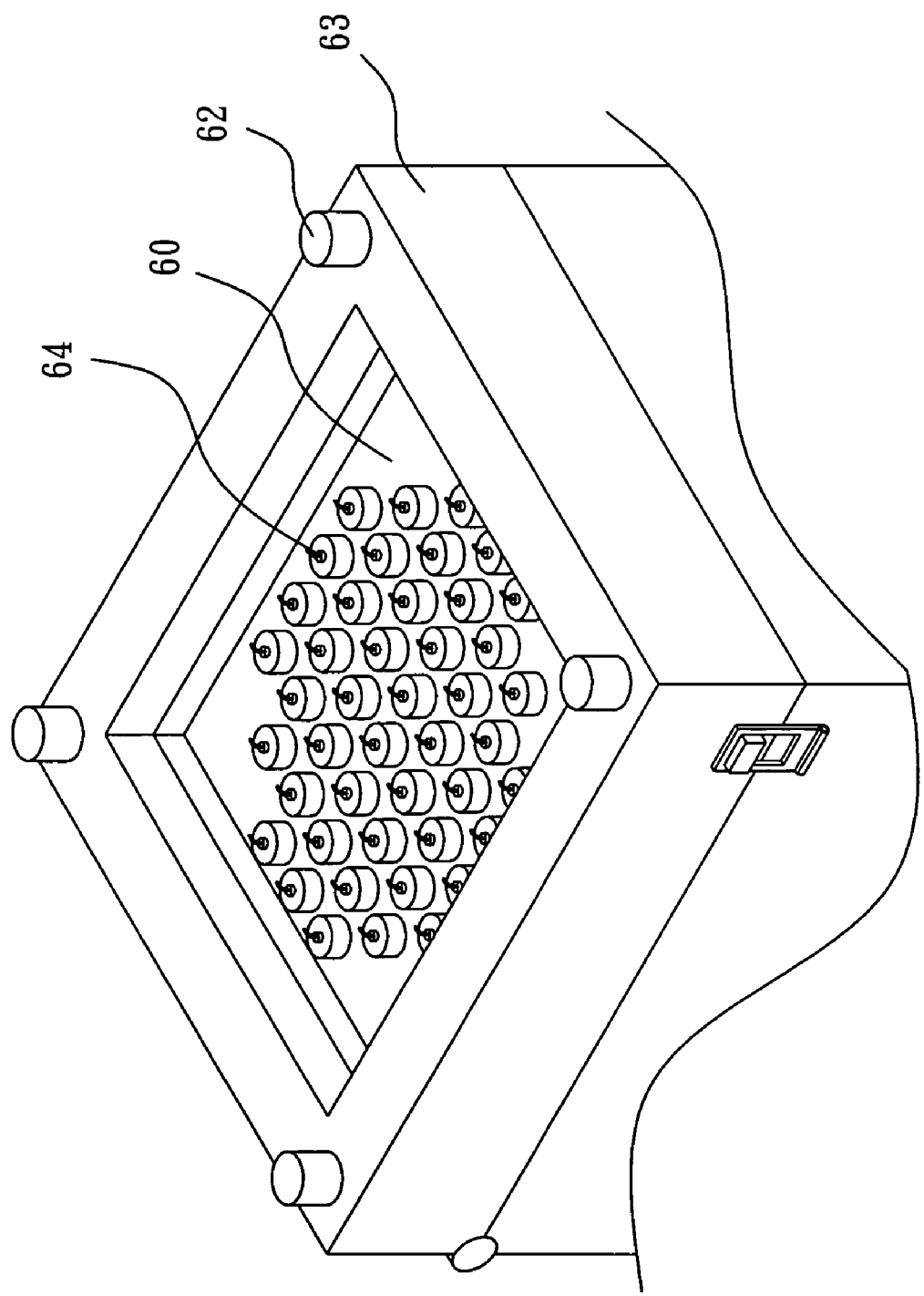
FIG. 15 is a prospective view, showing a practice pattern of a third preferred embodiment according to the present invention.

Please refer to FIGS. 14 and 15. A main difference between a mounting apparatus 60 in a third preferred embodiment of the present invention and the mounting apparatus 502 in the second preferred embodiment is that a plurality of symmetric fixing grooves 61 are disposed at the edges of the main body of the mounting apparatus 60 to replace the design that the accepting groove 501 of the mounting apparatus 502 shown in FIG. 11 is disposed in the center thereof so as to respectively accept the fixing rod 62, other structures of the mounting apparatus are almost same. The fixing rods 62 are respectively combined with the supporting stands 63 and the upper ends of the fixing rods 62 are exerted with downward pressures by means of a pressure exerting tool. The contact surface of engaging portion 621 protruded out at the bottom of the fixing rod 62 is on a same plane with the contact surface of the bottoms of a plurality of optical fibers 64 and a polishing surface 65 to cause the supporting point of the mounting apparatus is on the force exerted surface yielded form the end faces of the optical fibers 64 and the polishing surface 65 so that a torque is not yielded to cause the mounting apparatus 60 to be inclined and the phenomenon of a uneven pressure is not yielded.

And, a naturally contacted pressure exerted may is formed between the end faces of the optical fibers 64 and the polishing surface 65 to allow a same contact force to be kept between the polished end faces of the optical fibers 64 at different locations on the mounting apparatus 60 so as to obtain a same polished shape. Therefore, the polishing speed and quality can be enhanced.

Please refer to FIG. 16A. A main difference between a mounting apparatus 70 of a fourth preferred embodiment according to the present invention and the mounting apparatus 60 of the third preferred embodiment shown in FIG. 14 is that a plurality of symmetric accepting grooves 71 are disposed at the edges of the main body of the mounting apparatus 70 for accepting counterweights 72 to allow the mounting apparatus 70 to have the strength to cause the end faces of a plurality of optical fibers 73 to press down a polishing surface 74 so that a naturally contacted pressure exerted way is formed between the mounting apparatus 70 and the polishing surface 74. Furthermore, a plurality of symmetric contact elements, such as fixing rod 75, are disposed below the flank sides of the main body of the mounting apparatus 70, a protruded engaging portion 751 is disposed at the bottom of each fixing rod 75 and installed in a positioning element corresponding to a supporting stand 76, such as an accepting groove hole 761. Fluid can be discharged below the accepting groove holes 761 while polishing. The contact surface of the contact element such as the fixing rod 75 and the positioning element such as the accepting groove hole 761 and the contact surface of the end faces of the optical fibers and the polishing surface 74 are at a same plane to allow the supporting point of the mounting apparatus 70 to be on the force exerted surface yielded from the end faces of the optical fibers 73 and the polishing surface. Therefore, a torque force is not yielded to cause the mounting apparatus 70 to be inclined and the phenomenon of a uneven pressure is not happened. The polishing speed and quality can be enhanced.

The protruding engaging portion can also not existed at the bottom of the contact element such as the fixing rod 75 disposed below the flank side of the main body of the mounting apparatus 79 in this embodiment, but the positioning element such as the accepting groove hole 761 corresponding to the supporting stand 76 has protruding engaging portion 762. The bottom of fixing rod is installed in the engaging portion 762, as FIG. 16B shows. Or, the engaging portion is not existed at the bottoms of both of the accepting groove hole 761 of the supporting stand 76 and the fixing rod 75, the bottom of the fixing rod 75 is installed in a accepting groove hole 763 corresponding to each supporting stand 76 to cause the fixing rod 75 to be restrained by the accepting groove hole in the process of polishing, as FIG. 16C shows. Or, the poisoning element of the supporting stand 76 is a fixing rod 764 and the contact element of the main body of the mounting apparatus 70 is an accepting groove hole 765, and a protruding engaging portion 766 can be disposed in the accepting groove hole 765, the fixing rod 764 is installed in the engaging portion 766 to cause the contact element is restrained by the positioning element in the process of polishing, as FIG. 16D shows.

Another merit of this embodiment is that the mounting apparatus 70 can be driven conveniently by the supporting stand 76 to move to the position above another set of polishing surfaces 74 to process the polishing work for a different polishing surface 74 to the end faces of the optical fibers 73 so as to be advantageous in processing an automatic polishing work in accordance with different polishing surfaces.

Figure 17:
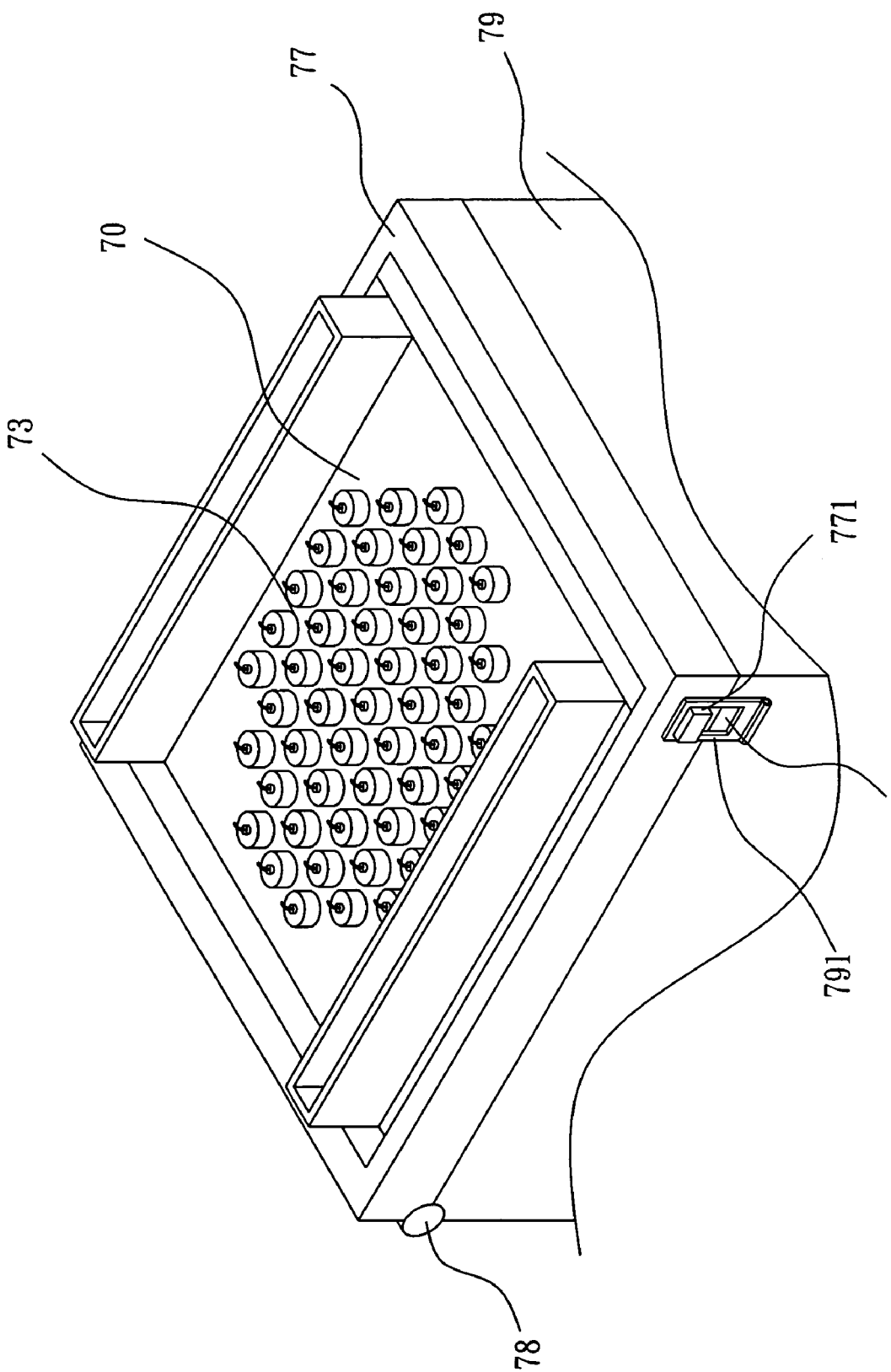
FIG. 17 is a cross sectional view, showing a mounting apparatus of a fifth preferred embodiment according to the present invention.
Figure 18:
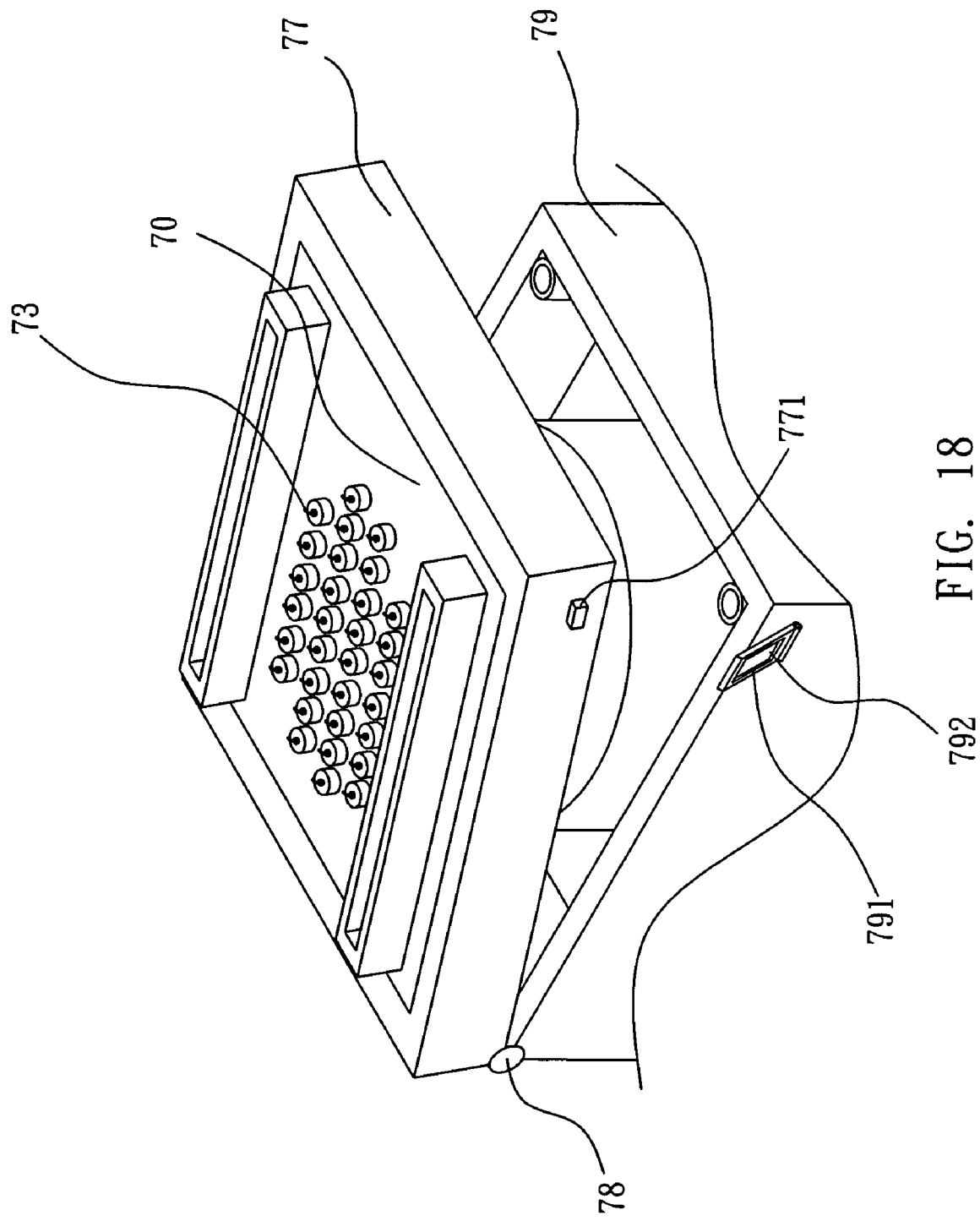
FIG. 18 is a schematic view, showing that a mounting apparatus is apart from a base seat according to a fifth preferred embodiment of the present invention.

Please refer to FIGS. 17 and 18. The mounting apparatus 70 of a fifth preferred embodiment according to the present invention is as same as the one shown in FIG. 16. But a supporting stand 77 is a frame type; one end thereof is connected to one side of a base seat 79 of the polishing surface 74 through a shaft 78 and the two sides of another end thereof are buckled with the base seat 79 through detachable buckling units. The buckling units of this embodiment can be two buckling ears; one end of each buckling ear 791 is pivotally connected to each of the two side of the base seat 79. Two tenons 771 corresponding to the two buckling ears 791 are dispose at the two sides of the supporting stand 77. A buckling hole 792 of each buckling ear 791 can be buckled up the tenon 771 to allow the supporting stand 77 to be combined with the base seat 79, as FIG. 17 shows.

The structure for quickly detaching and buckling the supporting stand 77 and the base seat 79 used in this embodiment can allow a polishing surface to be changed conveniently so as to allow the end faces of the optical fibers 73 to be polished with different polishing surfaces.

Figure 19:
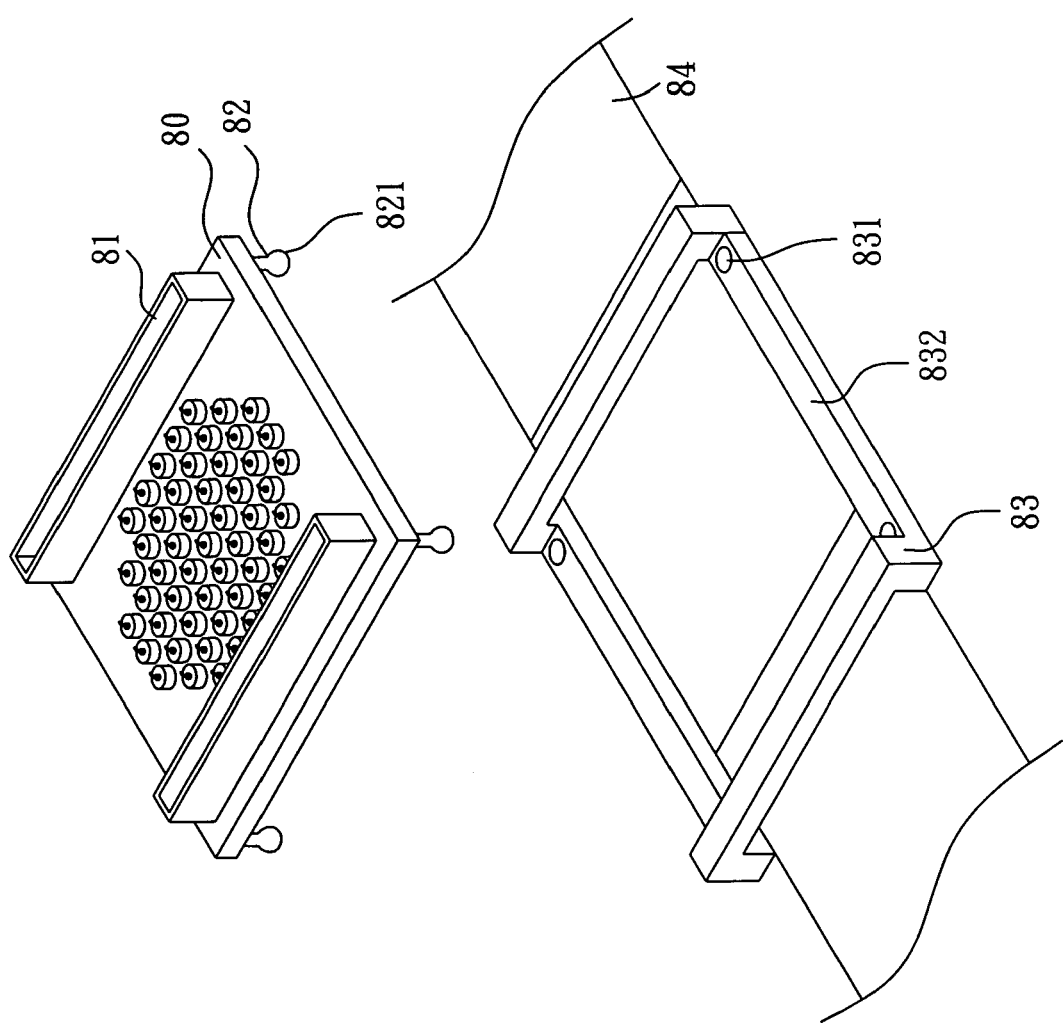
FIG. 19 is a prospective view, showing a mounting apparatus of a sixth preferred embodiment according to the present invention.

Please refer to FIG. 19. a plurality symmetric accepting grooves 81 are disposed at the upper side of the main body of a mounting apparatus 80 of a sixth preferred embodiment according to the present invention, and a plurality of symmetric fixing pins 82 are disposed at the bottom of the main body thereof. The bottom of each fixing pin 82 has a protruding engaging portion 821 for being accepted in an accepting groove 831 of a frame type supporting stand 83. The supporting stand 83 has a pair of indented flank sides 832 and the bottom of each accepting groove 831 has a sink disposed in the indented flank side 832. The supporting stand 83 can be moved above a continuous polishing surface 84 so as to process the polishing works on polishing surface contained with different sizes of particles.

Figure 20:
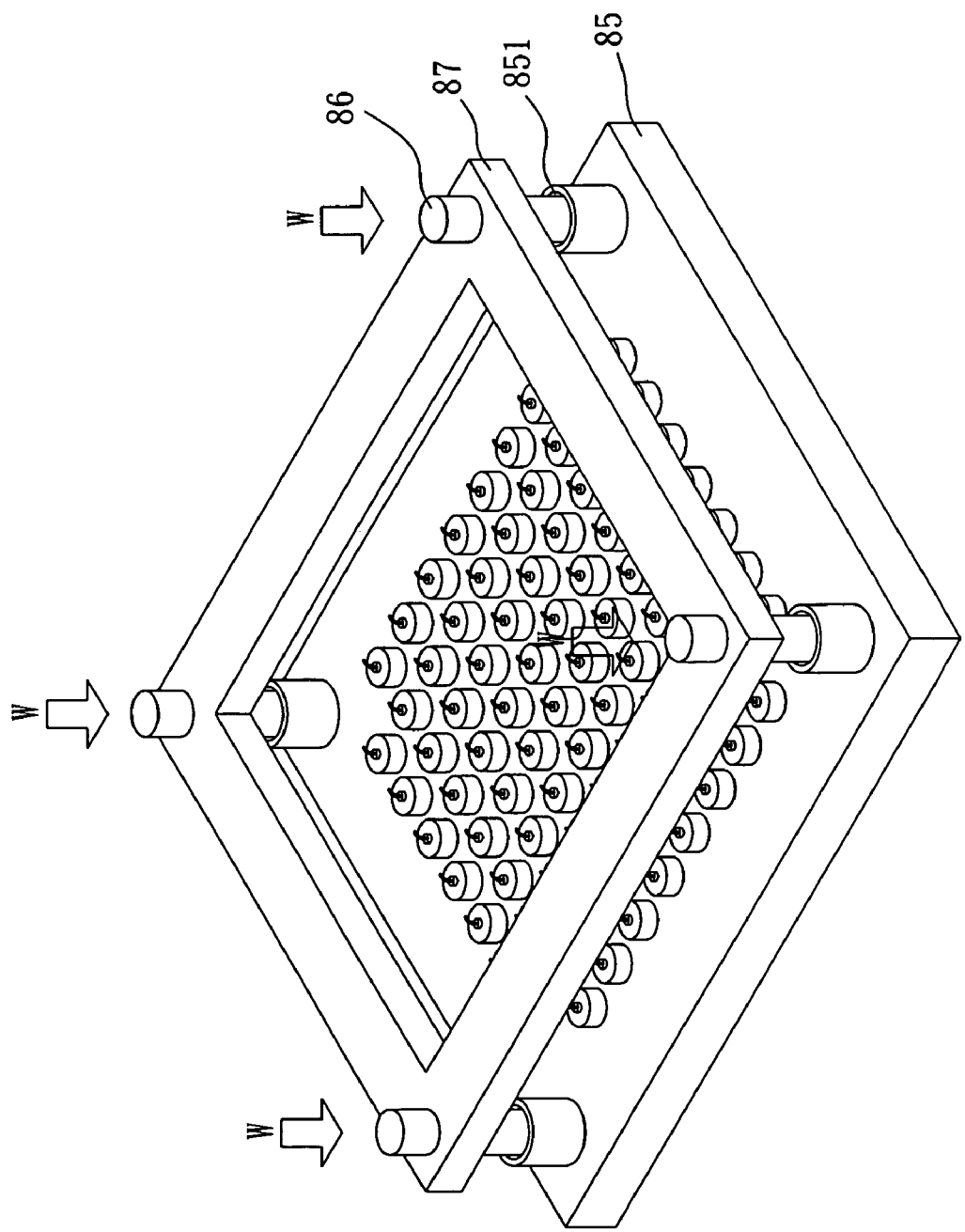
FIG. 20 is a prospective view, showing a mounting apparatus of a seventh preferred embodiment according to the present invention.

Please refer to FIG. 20. A plurality of symmetric accepting grooves 851 for accepting fixing rods 86 are disposed at four corners of the main body of a mounting apparatus 85 of a seventh preferred embodiment according to the present invention. The fixing rods 86 are combined with a frame type supporting stand 87. A pressure can be exerted downward on the mounting apparatus 85 from the upper side of the fixing rod 86.

Figure 21:
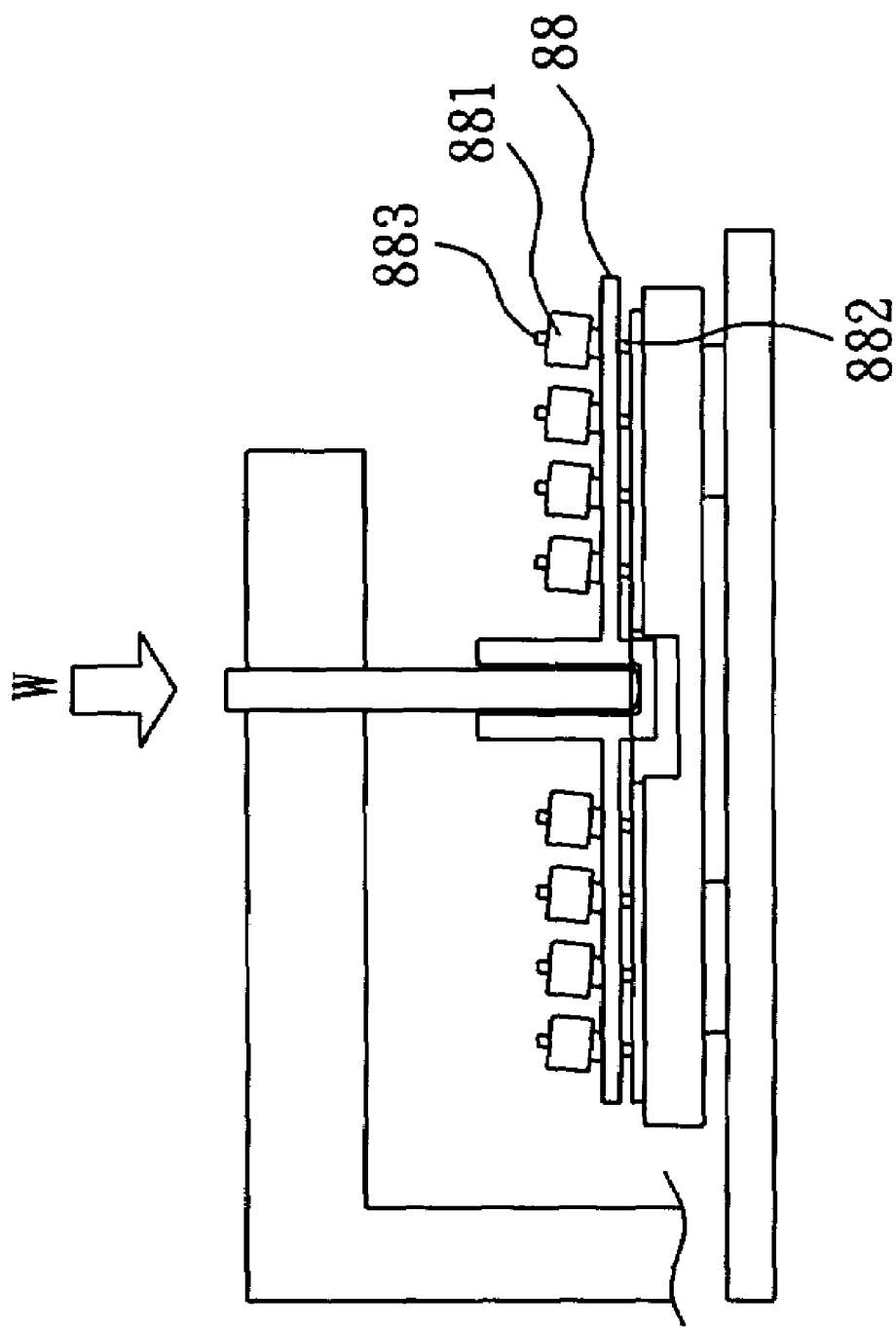
FIG. 21 is a prospective view, showing a mounting apparatus of a eighth preferred embodiment according to the present invention.

Please refer to FIG. 21. The main body of a mounting apparatus 88 of an eighth preferred embodiment according to the present invention is combined with a plurality of fixtures 881. Each fixture 881 is combined with an obliquely disposed ferrule 882 for the end face of an optical fiber for being combined with a obliquely disposed optical fiber 883 to be polished. The optical axis of the projected spherical face of the optical fiber 883 after polishing is formed a small inclined angle with the center line of the optical fiber.

Figure 22:
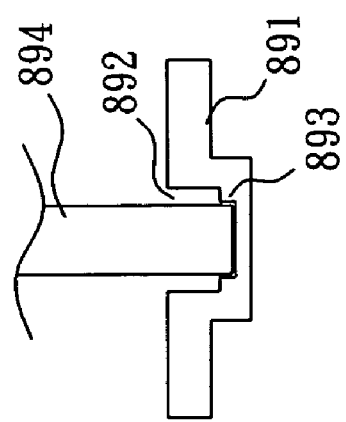
FIGS. 22 and 23 are cross sectional views, showing a fixing groove and fixing rod of another preferred embodiment according to the present invention.
Figure 23:
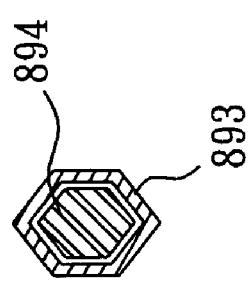

Please refer to FIGS. 22 and 23. A protruding engaging portion 893 is allowed to be disposed at the bottom of a fixing groove 892 of the main body of a mounting apparatus 891 according to the present invention, a fixing rod 894 is allowed to contact only with the engaging portion 893 in the fixing groove 892. The engaging portion 893 and the fixing rod 894 are formed as corresponding concave and convex faces such as corresponding polygons to cause no rotation between the fixing rod 894 and the fixing groove 893.

Figure 24:
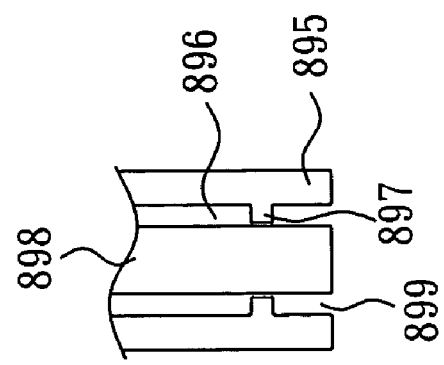
FIG. 24 is cross sectional view, showing a fixing groove and fixing rod of still another preferred embodiment according to the present invention.

Please refer to FIG. 24. A protruding engaging portion 897 is allowed to be disposed at the bottom of a fixing groove 896 of the main body of a stand body 895 according to the present invention, a fixing rod 898 is allowed to contact only with the engaging portion 897 in the fixing groove 896. a sink hole 899 is disposed at the bottom of the fixing groove 896.

Figure 25:
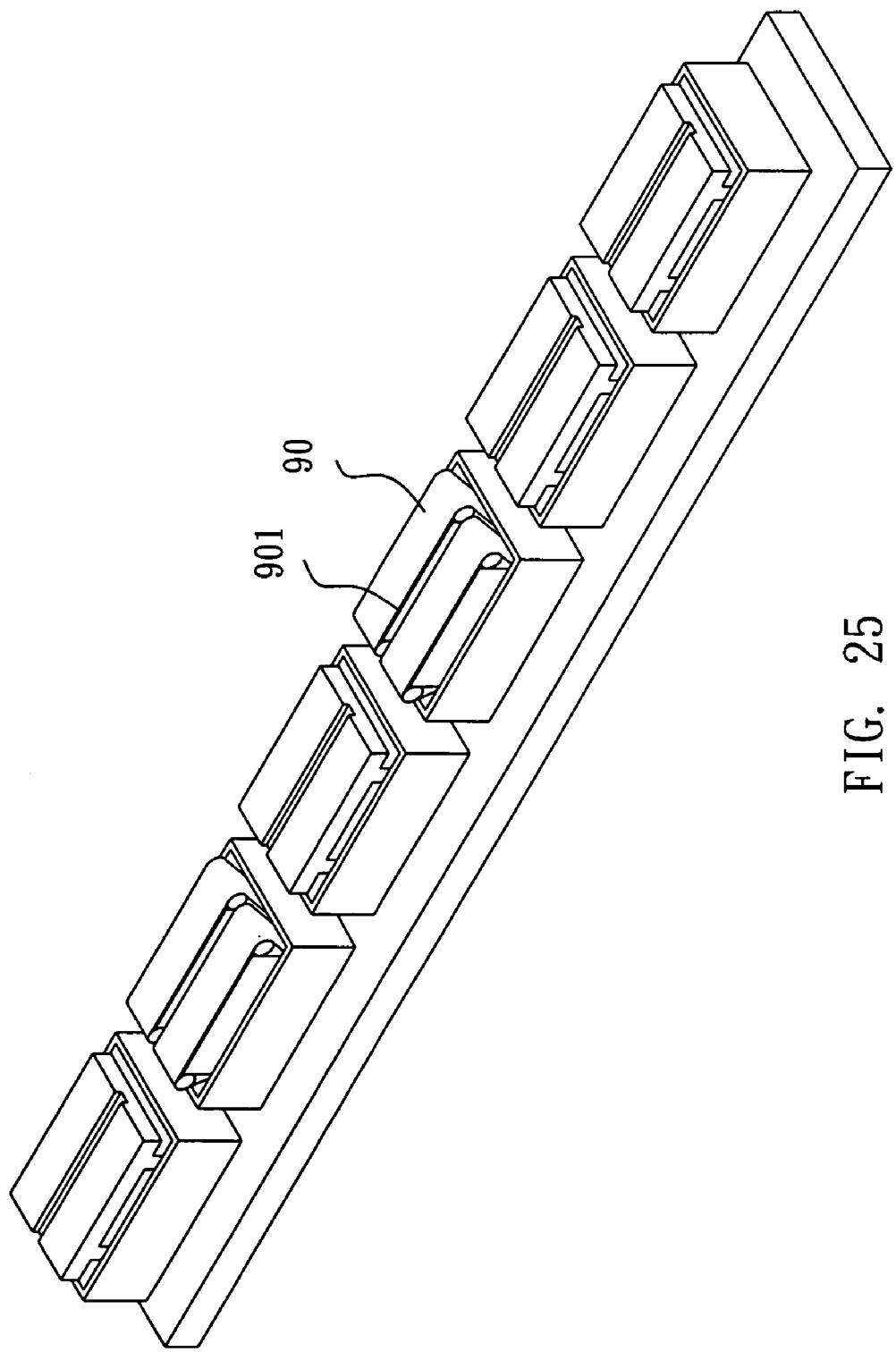
FIG. 25 is a schematic view, showing a first kind of conventional continuous polishing surface facility.
Figure 26:
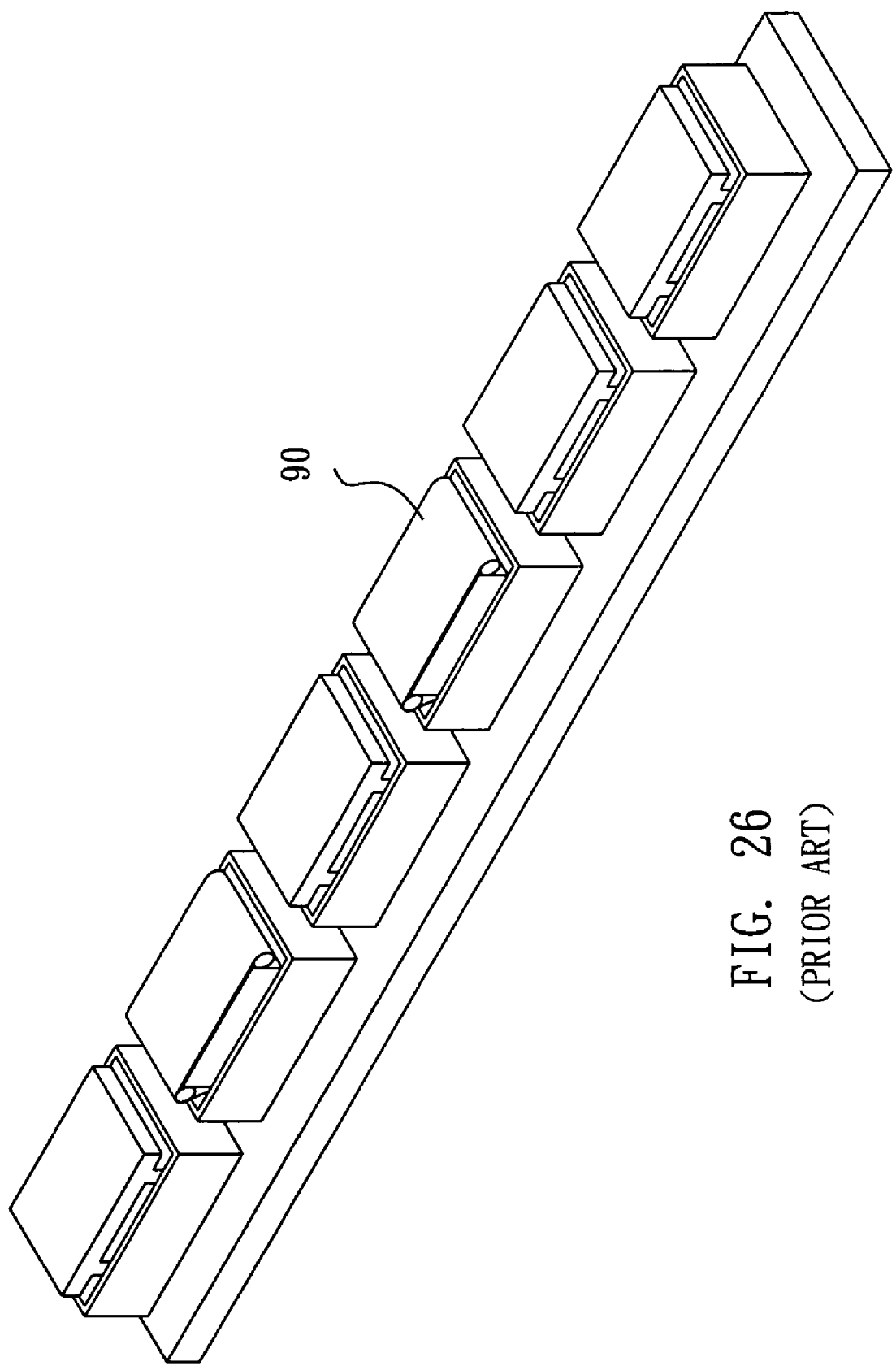
FIG. 26 is a schematic view, showing a second kind of conventional continuous polishing surface facility.

Those shown in FIGS. 25 and 26 are use to match up with two conventional continuous polishing surfaces 90 and 91 with different coarse and fine particles used in every preferred embodiment according to the present invention, in which a groove 901 is disposed at the middle of the polishing surface 90 for accepting downward raised parts at the middle of the mounting apparatuses respectively shown in FIGS. 7 and 11. The middle of the polishing surface 91 has no groove; it is used for the mounting apparatuses 60 and 70 respectively shown in FIGS. 14 and 16.

Because coarser polishing particles are needed to use first in the process of polishing, and finer polishing particles are then used. If the structure of a mounting apparatus is too complex or full of gaps, the coarse particles are easy to be left in the gaps so as the influence the polishing quality. At this time, wax, rosin or plastics can be used to fill up gaps in the ferrule of the polishing end of the mounting apparatus to be advantageous on polishing.

Besides, whether the end faces of optical fibers are uniformly mounted on a mounting apparatus for the end faces of optical fibers is a cause for influencing the uniformity of pressure. If a several causes such as that optical fibers to be polished are two few are aroused, fake ferrules can be then used to fill up to cause the pressure to be uniformly distributed. The fake ferrule talked here is as same shape as the ferrule to be polished, but without an optical fiber in the middle thereof. The material of this fake ferrule is metal, plastics, glass or ceramics.

A fixed distance must be kept between a fixing rod and the upper part of a fixing groove to prevent the upper part of the fixing groove from being contacted with the fixing rod in the process of polishing. Because if both of them are contacted, the contact point immediately becomes a supporting point, the uniformity of pressure can then be influenced.

The supporting point of a mounting apparatus is on the plane formed by force exerted surface and a naturally contacted pressure exerted way is formed between the end faces of optical fibers on the mounting apparatus and a polishing surface. Therefore, the contact pressure between the polishing end face of the optical fiber at the different location on the mounting apparatus and the polishing surface can rather be kept constant so as to allow a same batch work of the polished end faces to be obtained a same polished shape. Therefore, more optical fibers to be polished can be combined together to process polishing concurrently. Comparing with a general conventional mounting apparatus, the polishing speed and quality of optical fibers can obviously be enhanced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mounting apparatus for polishing end faces of workpieces comprising:
   a) a main body having at least one fixing groove;
   b) at least one fixing rod inserted into one of the at least one fixing groove, an interior side surface of one of the at least one fixing groove and an exterior side surface of each of the at least one fixing rod are spaced apart a spacing distance except for an engaging portion, the engaging portion being selected from a group consisting of a first protruding engaging portion located on a bottom end of the exterior side surface of each of the at least one fixing rod and a second protruding engaging portion located on a bottom end of the interior side surface of each of the at least one fixing groove, the spacing distance being less than 20 centimeters;
   c) a supporting stand connected to an upper end of each of the at least one fixing rod;
   d) a plurality of fixtures connected to the main body and positioning the workpieces to be polished; and
   e) a contact plane located between a polishing surface and the end faces of the workpieces.

2. The mounting apparatus according to claim 1, wherein the at least one fixing groove is a single fixing groove located at a center of the main body, and the at least one fixing rod is a single rod having a shape corresponding with the fixing groove and preventing the fixing rod from rotating relative to the fixing groove.

3. The mounting apparatus according to claim 1, wherein the at least one fixing groove includes a plurality of fixing grooves located on edges of the main body, and the at least one fixing rod is a plurality of fixing rods, one of the plurality of fixing rods is inserted into each of the plurality of fixing grooves.

4. The mounting apparatus according to claim 1, wherein each of the plurality of fixtures has at least one ferrule obliquely located thereon and corresponding with an obliquely located workpiece.

5. The mounting apparatus according to claim 4, wherein spaces between the at least one ferrule of the the plurality of fixtures are filled with a material selected from wax, rosin, and plastics.

6. The mounting apparatus according to claim 4, wherein the at least one ferrule of the plurality of fixtures includes a fake ferrule.

7. The mounting apparatus according to claim 6, wherein the fake ferrule is made of a material selected from a group consisting of metal, plastics, glass and ceramics.

8. The mounting apparatus according to claim 1, wherein the spacing distance is less than 10 millimeters.

9. The mounting apparatus according to claim 1, wherein the main body has a plurality of symmetrical accepting grooves equally spaced apart on the edges thereof and a counterweight located in each of the plurality of symmetrical accepting grooves.

10. The mounting apparatus according to claim 9, wherein each of the plurality of symmetrical accepting grooves has a shape selected from a group of hollow shapes comprising an arc groove shape, a cylindrical groove shape, and a rectangular groove shape.

11. The mounting apparatus according to claim 1, wherein a bottom end surface of each of the at least one fixing rod is curved.

12. The mounting apparatus according to claim 1, wherein the main body has a shape selected from a group of shapes consisting of circular and square.

13. The mounting apparatus according to claim 1, wherein each of the plurality of fixtures has at least one ferrule obliquely located thereon and corresponding with an obliquely located workpiece.

14. A mounting apparatus for polishing end faces of workpieces comprising:
   a) a main body having:
      i) a plurality of fixtures connected to a top surface thereof and positioning the workpieces to be polished; and ii) a plurality of contact elements extending downwardly from a bottom thereof; and b) a supporting stand having a plurality of positioning elements, one of the plurality of positioning elements engaging an engaging portion of each of the plurality of contact elements, one of the plurality of positioning elements being spaced apart a spacing distance from each of the plurality of contact elements except for the engaging portion, the spacing distance being less than 20 centimeters, wherein the plurality of contact elements and the plurality of positioning elements are selected from a group consisting of each of the plurality of contact elements are a fixing rod and each of the plurality of positioning elements are a groove hole, and each of the plurality of contact elements are a groove hole and each of the plurality of positioning elements are a fixing rod.

15. The mounting apparatus according to claim 14, wherein each of the plurality of fixtures has at least one ferrule obliquely located thereon and corresponding with an obliquely located workpiece.

16. The mounting apparatus according to claim 15, wherein spaces between the at least one ferrule of the the plurality of fixtures are filled with a material selected from wax, rosin, and plastics.

17. The mounting apparatus according to claim 15, wherein the at least one ferrule of the plurality of fixtures includes a fake ferrule.

18. The mounting apparatus according to claim 17, wherein the fake ferrule is made of a material selected from a group consisting of metal, plastics, glass and ceramics.

19. The mounting apparatus according to claim 14, wherein the spacing distance is less than 10 millimeters.

20. The mounting apparatus according to claim 14, wherein the main body has a plurality of symmetrical accepting grooves equally spaced apart on the edges thereof and a counterweight located in each of the plurality of symmetrical accepting grooves.

21. The mounting apparatus according to claim 20, wherein the supporting stand is a frame having two opposing first sides having top surfaces located at a height lower that a height of two opposing second sides, the plurality of symmetrical accepting grooves are located in the two opposing first sides.

22. The mounting apparatus according to claim 14, wherein the engaging portion is a protrusion extending from a bottom of a location selected from a group consisting of one of the plurality of contact elements and one of the plurality of positioning elements.

23. The mounting apparatus according to claim 14, further comprising a base seat and two buckling units, the supporting stand being pivotally connected to the base seat at a rear thereof and having the two buckling units selectively locking and unlocking the supporting stand with the base seat, one of the two buckling units is located on each of two opposing sides of the supporting stand and the base seat.

24. The mounting apparatus according to claim 23, wherein each of the two buckling units includes a buckling ear pivotally connected to the base seat and a tenon located on the supporting stand, one tenon selectively engaging each buckling ear.

* * * * *